United States Patent
Deri et al.

(10) Patent No.: US 9,721,166 B2
(45) Date of Patent: Aug. 1, 2017

(54) SYSTEM AND METHOD FOR IDENTIFYING A PARTICULAR HUMAN IN IMAGES USING AN ARTIFICIAL IMAGE COMPOSITE OR AVATAR

(71) Applicant: QOGNIFY LTD., Ra'anana (IL)

(72) Inventors: Oren Deri, Herzliya (IL); Yaniv Gurwicz, Givataim (IL); Vladimir Goldner, Tel Aviv (IL)

(73) Assignee: Qognify Ltd., Ra'anana (IL)

( * ) Notice: Subject to any disclaimer, the term of this patent is extended or adjusted under 35 U.S.C. 154(b) by 81 days.

(21) Appl. No.: 14/517,856

(22) Filed: Oct. 19, 2014

(65) Prior Publication Data

US 2015/0036883 A1  Feb. 5, 2015

Related U.S. Application Data

(63) Continuation-in-part of application No. 14/109,995, filed on Dec. 18, 2013, now Pat. No. 9,471,849.

(Continued)

(30) Foreign Application Priority Data

May 5, 2013 (IL) .......................................... 226175

(51) Int. Cl.
*G06K 9/00* (2006.01)
*G06K 9/46* (2006.01)
*G06F 3/0482* (2013.01)
*G06F 3/0484* (2013.01)
*G06K 9/62* (2006.01)

(52) U.S. Cl.
CPC ....... *G06K 9/00771* (2013.01); *G06F 3/0482* (2013.01); *G06F 3/04842* (2013.01); *G06K 9/00369* (2013.01); *G06K 9/4652* (2013.01); *G06K 9/6277* (2013.01)

(58) Field of Classification Search
None
See application file for complete search history.

(56) References Cited

U.S. PATENT DOCUMENTS

2007/0122003 A1  5/2007  Dobkin et al.
2010/0157049 A1  6/2010  Dvir et al.
(Continued)

OTHER PUBLICATIONS

Han H, Klare BF, Bonnen K, Jain AK. Matching composite sketches to face photos: A component-based approach. Information Forensics and Security, IEEE Transactions on. Jan. 2013;8(1):191-204.*

(Continued)

*Primary Examiner* — Vu Le
*Assistant Examiner* — Tracy Mangialaschi
(74) *Attorney, Agent, or Firm* — Pearl Cohen Zedek Latzer Baratz LLP

(57) ABSTRACT

A system and method for detecting a particular human in a plurality of images of humans may include one or more processors to receive input data describing the appearance of the particular human via a graphical user interface (GUI). An image representing the particular human may be generated based on the input data. This may take the form of an avatar or artificial image. This artificial or processor-generated image may be used to identify one or more of the humans in said plurality of images as a candidate for the particular human.

14 Claims, 22 Drawing Sheets

Related U.S. Application Data

(60) Provisional application No. 62/020,540, filed on Jul. 3, 2014.

(56) References Cited

U.S. PATENT DOCUMENTS

| | | |
|---|---|---|
| 2011/0320495 A1 | 12/2011 | Levy-Yurista et al. |
| 2013/0155229 A1 | 6/2013 | Thornton et al. |
| 2013/0287250 A1 | 10/2013 | Lee |
| 2014/0049600 A1 | 2/2014 | Goldner et al. |

OTHER PUBLICATIONS

Pham, Thang V., Marcel Worring, and Arnold WM Smeulders. "A multi-camera visual surveillance system for tracking of reoccurrences of people." Distributed Smart Cameras, 2007. ICDSC'07. First ACM/IEEE International Conference on. IEEE, 2007.*

Bak, Slawomir, et al. "Person re-identification using haar-based and dcd-based signature." Advanced Video and Signal Based Surveillance (AVSS), 2010 Seventh IEEE International Conference on. IEEE, 2010.*

U.S. Appl. No. 14/142,854, filed Dec. 29, 2013, Shmueli, Yaron.

Farenzena et al., "Person Re-Identification by Symmetry-Driven Accumulation of Local Features", 2010 IEEE Conference on Computer Vision and Pattern Recognition (CVPR), Jun. 13-18, 2010, San Francisco, CA, pp. 2360-2367.

Prosser et al., "Person Re-Identification by Support Vector Ranking". In Frédéric Labrosse, Reyer Zwiggelaar, Yonghuai Liu, and Bernie Tiddeman, editors, Proceedings of the British Machine Vision Conference, pp. 21.1-21.11. BMVA Press, Sep. 2010.

Zheng et al., "Person Re-identification by Probabilistic Relative Distance Comparison", 2011 IEEE Conference on Computer Vision and Pattern Recognition (CVPR), Jun. 20-25, 2011, Providence, RI, pp. 649-656.

Berdugo et al., "Object Reidentification in Real World Scenarios Across Multiple Non-Overlapping Cameras", 18th European Signal Processing Conference (EUSIPCO-2010), Aalborg, Denmark, Aug. 23-27, 2010, pp. 1806-1810.

Tamar Avraham and Michael Lindenbaum, "Explicit vs. Implicit Appearance Transfer for Person Re-identification", 2013, 21 pages.

Bialkowski et al., "A Database for Person Re-Identification in Multi-Camera Surveillance Networks", 2012 International Conference on Digital Image Computing Techniques and Applications (DICTA), Dec. 3-5, 2012, Fremantle, WA, pp. 1-8.

Liebig, Thomas et al. "Modelling Microscope Pedestrian Mobility using Bluetooth." ICAART (2). 2012.

Sabean Jonathan et al. "Inventory of Current Programs for Measuring Wait Times at Land Border Crossings." Transport Canada and Federal Highway Administration. May 21 (2008): 2008.

Satta, Riccardo et al. "A Multiple Component Matching Framework For Person re-identification." Image and Analysis and Processing—ICIAP 2011. Springer Berlin Heidelberg, 2011. 140-149.

U.S. Appl. No. 14/109,995 dated Nov. 4, 2015.

\* cited by examiner

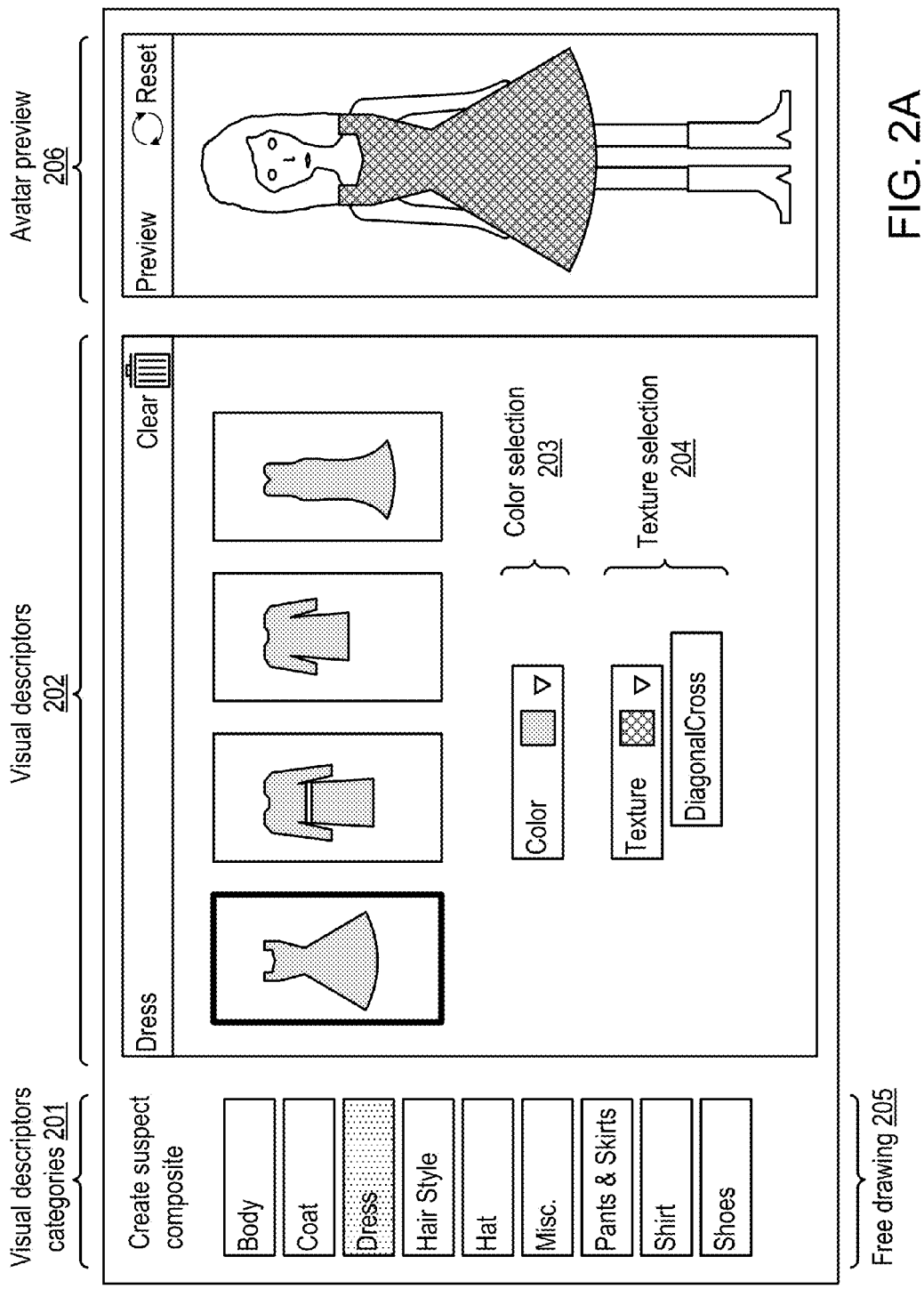

| | | |
|---|---|---|
|  | Cross | Specifies horizontal and vertical lines that cross |
|  | Divot | Specifies a hatch that has the appearance of divots |
|  | Dotted Grid | Specifies horizontal and vertical lines, each of which is composed of dots that cross |
|  | Forward Diagonal | A pattern of lines on a diagonal from the upper left to lower right |
|  | Horizontal | A pattern of horizontal lines |
|  | Checker Board | Specifies a hatch that has the appearance of a checkerboard |
|  | Vertical | A pattern of vertical lines |
|  | Plaid | Specifies a hatch that has the appearance of a plaid material |
|  | Shingle | Specifies a hatch that has the appearance of diagonally layered shingles that slant to the right from top points to bottom points |
|  | Sphere | Specifies a hatch that has the appearance of spheres laid adjacent to one another |
|  | Trellis | Specifies a hatch that has the appearance of a trellis |
|  | Vertical | A pattern of vertical lines |
|  | Wave | Specifies horizontal lines that are composed of tildes |
|  | Weave | Specifies a hatch that has the appearance of a woven material |
|  | Zig-Zag | Specifies horizontal lines that are composed of zigzags |

FIG. 3

SYSTEM AND METHOD FOR IDENTIFYING A PARTICULAR HUMAN IN IMAGES USING AN ARTIFICIAL IMAGE COMPOSITE OR AVATAR

CROSS REFERENCE TO RELATED APPLICATIONS

This application claims the benefit of prior U.S. Provisional Application Ser. No. 62/020,540 filed Jul. 3, 2014, and is a continuation-in-part of prior U.S. patent application Ser. No. 14/109,995 filed Dec. 18, 2013 which in turn claims the benefit of Israel patent application 226175 filed May 5, 2013, all of which are incorporated herein by reference in their entirety.

FIELD OF THE INVENTION

The present invention is in the field of video surveillance. In particular, embodiments of the present invention are directed to identifying a particular human in video footage.

BACKGROUND OF THE INVENTION

Video surveillance is widely used. For example, suspect search systems that identify, track and/or monitor an individual use video surveillance or video monitoring. Video Content Analysis (VCA) or video analytics are known and used, e.g., for automatic analysis of a video stream to detect or identify points or items of interest. Video analytics is becoming more prevalent in a wide range of domains such as security, entertainment, healthcare and surveillance.

There is room for improvement in current video analytics systems in terms of the amount of data processing required for detection and identification. Also, particularly but not exclusively in the security field, it is desirable to facilitate, e.g. make easier, the input of data by human users relating to particular objects to be identified. Such objects may be persons or humans. For example it is desirable to capture data relating to a lost child as quickly as possible so that he or she can then be identified in video footage as quickly as possible. The same applies to other humans such as but not limited to terrorist suspects and kidnap victims. These humans are referred to in the following as particular humans or persons or target humans. There is often a need to identify them in images which depict many humans from which the particular or target human needs to be selected.

SUMMARY OF EMBODIMENTS OF THE INVENTION

Embodiments of the invention provide methods and systems for detecting a particular human in a plurality of images including humans, such as might be found in video footage. Methods according to the invention may use one or more processors. Embodiments of the invention may include receiving input data describing the appearance of the particular human, or target human. This input may be received, for example, via a graphical user interface (GUI). A representation of the particular person or human may then be generated using the one or more processors, based on the input data. This representation may be a simplified representation of the particular human as compared for example to a camera image since it may be based on more limited data than is available, for example, from a digital image. As such it may be in the form of an avatar. A signature for the particular human may then be generated using the input data, for example based on the representation. This signature may be used to identify one or more of the humans in the video footage as a candidate or possible match for the particular human. The representation may be a visual representation but this is not essential. Embodiments of the invention may comprise preparing a structured representation for example comprising a list of avatar parts. Each part may for example be represented by metadata.

The representation or avatar may form a reference object (RO) for a search system against which other objects are compared. The system may then generate candidate objects (COs) based on the degree of similarity with the reference object, from which the closest match can be chosen, for example by a human operator.

According to some embodiments of the invention, the identified candidates, or COs, are then presented to a user to enable the user to identify which of the candidates is the particular human.

An embodiment of a method according to the invention may include extracting images of humans from the plurality of images, for example in video footage, and generating respective signatures for at least some of the humans using the extracted images. The signatures generated using the extracted images may then be compared with the signature generated from the input data to identify one or more humans in the plurality of images as a candidate for the particular human. It should be noted that the extracted images need not be images of complete humans. For example, depending on the nature of the plurality of images from which the images of humans are extracted, they may include only head and shoulders for some or all humans.

The signatures generated from the plurality of images, for example using the extracted images of humans, can be considered to be based on real data of which video footage is an example. By contrast, a signature based on a processor-generated representation as described above might be considered to be based on artificial data and may be termed an artificial image. As used herein, the term "representation" is used to distinguish an accurate image such as may be produced by a camera from an image generated from input data which leads to a simplified or estimated image.

A signature for the representation of the person or human may be generated in the same way as a signature for an image such as a camera image. Thus according to embodiments of the invention at least some of operations performed on the representation in order to generate a signature for the particular person or human are also performed on the extracted images in order to generate the signatures for humans included in the images. The same general signature generation algorithm may be used for both images and avatars.

The generation of signatures for at least some of the humans shown in the plurality of images may result in more than one signature being generated for the same human. This might occur for example if the same human is shown in different images from different angles. Image processing technology might be used to determine identity of subject between different images so that repeated signatures of the same human are not generated thereby wasting processing power, and time.

The plurality of images e.g. in the video footage, may include several images each of single humans, which may be different from each other, images each showing multiple humans, or any combination of these.

As noted above, the processor-generated representation for the particular human can be considered to be a form of avatar by which is meant an artificial figure such as an icon used to represent a particular person. According to some embodiments, the processor generated representation may be created by first providing a basic or generic, e.g. cartoon, image of a human and then modifying that image based on received input data. It may be created in the same way as a character for a computer game as is known in the art. According to embodiments of the invention many characteristics of the basic image may be modified in response to input data. It is particularly useful for the input data to include color data such as hair color, skin color, color of clothing etc. The avatar or processor-generated representation has the advantage over a photograph, for example, in that the input data from which it is created may be based on most recent memory, for example a recent sighting of the particular human. This may in some circumstances be more useful than a photograph which may show the target human wearing different clothes from those worn on the day of the search. Also it will be appreciated that it has the potential to include more information than, say, a text description of the particular human. Nevertheless, according to some embodiments of the invention, the input data may be no more than a plain language, e.g. text description of features such as "black jacket, white T-shirt". This may be applied to a generic image of a human from which representation and then a signature is created for a target human and compared to signatures generated from video images. This has proved to be more effective in identifying individuals than, for example, searching for particular features such as individuals with black jackets and white T-shirts.

Embodiments of the invention also provide novel methods of generating signatures of images, or objects in images. The objects may be humans or persons and the images may be avatars or camera images such as video stills.

Embodiments of the invention include systems and methods in which two images of an object (which may or may not be the same object), for example a human or person, are compared in order to determine a similarity score.

According to some embodiments, a signature for each image may be generated based on the distribution of colors in different parts of the image. Thus if the image is an image of a person or human, the signature will be a signature for the person or human which can be used in other embodiments of the invention described above. The signatures may be used to define groups of dominant colors in different parts of the images. Then so-called multiplets of colors may be defined comprising a first group of colors from selected parts of one of the images and a second group of colors from selected parts of the other image. In the context of this description the term "multiplet" is used in its broadest definition to simply refer to a group of closely associated things, in this case colors. The parts might be body parts such as head and torso or they may be more precisely defined such as a layer or area within the image. Operations are then performed on the multiplets to determine the similarity score. This comparison method may compare the spatial relationship between colors in the respective images rather than the colors themselves.

According to other embodiments, for each of two images to be compared, regions of a similar attribute are determined and for each of these regions a parameter, such as covariance, may be determined to produce a signature for the object comprising a set of the determined parameters. The two signatures may then be compared in order to determine the similarity score. According to some embodiments, the regions may be located along a line of highest cumulative value of the same attribute, such as energy, or another attribute. The determination of the regions may include deriving a number of patches along the line of highest attribute value and subjecting the patches to further processing to determine a lower number of regions.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 2A shows an example of a GUI that might be presented to a user as part of a method according to embodiments of the invention;

FIG. 3 shows a list of textures for selection according to embodiments of the invention;

Figure 1:
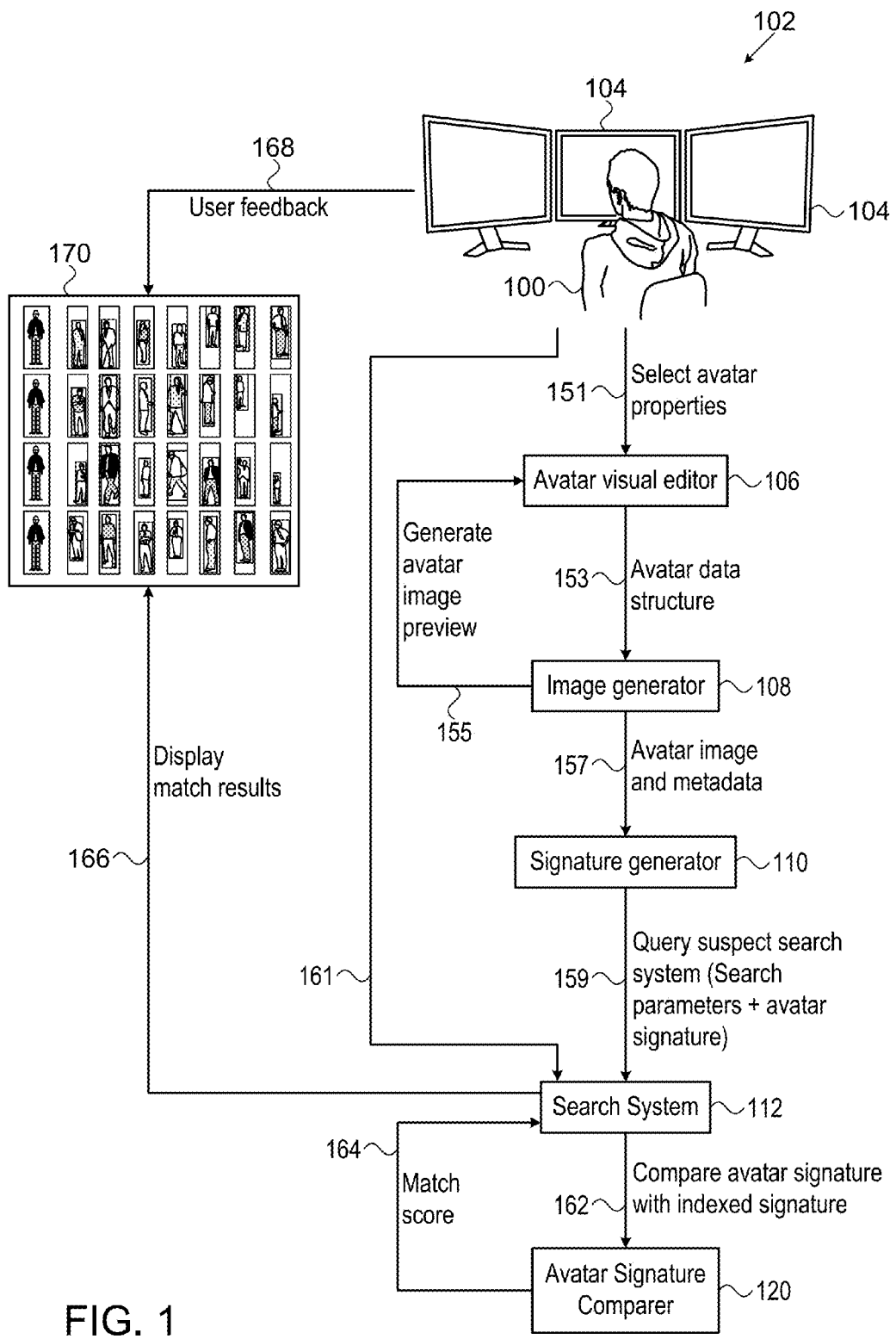
FIG. 1 is a combined data flow and system component diagram for a method and system of detecting a target human in multiple images including humans according to embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information transitory or non-transitory processor-readable medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

FIG. 1 illustrates schematically a process flow according to embodiments of the invention that may be used to generate a representation of a particular, hereinafter also referred to as "target", human or person based on input data. Such a representation is also referred to in the following as an avatar, or avatar image, and using one or more processors may be distinguished from a "real" image of a human extracted from a photograph for example. FIG. 1 shows a user 100 at a computing device 102 including display 104. A suitable computing device is a desktop personal computer and is described further below with reference to FIG. 10. The first operation by the user may be to select avatar properties, for example via a user interface (UI) such as a GUI shown on the display 104. This may be a dedicated UI termed an avatar visual editor indicated by reference 106. This enables a user to build a visual representation of the target human. Thus a system according to an embodiment of the invention may receive input data describing the appearance of a particular human. According to some embodiments of the invention this is done by presenting, e.g. displaying, to the user a figure representing a human and receiving input to change the figure to more closely resemble the target human to create an avatar or representation. Such input may include type of clothing including but not limited to any of shirt, pants, dress, shirt and hat; texture of clothing, color of clothing, color of skin and hair, logos on clothing and many more items. Alternatively or additionally the user may provide initial input to generate a representation of a human, such as a freehand sketch, for example via a touch screen, which may then be altered by the user. GUI or avatar visual editor software may manipulate freehand input to improve, for example smooth shaky lines, the input sketch. This figure or avatar may be a simple cartoon-like figure and is a processor-generated image, also known in the art as a computer generated image (CGI).

Embodiments of the invention may be implemented using computer software implemented or executed using one or more processors. This may run or be executed on the computing device 102 operated by the user 100 or on one or remote servers or its operations may be distributed between user device 102 and server(s). The software may include or when executed act as a plurality of modules including for example the avatar visual editor 106 and further comprising image generator 108. The image generator 108 may be a backend component and may generate an avatar image of a human as described in the preceding paragraph using one or more processors. In the context of this description "backend" is used to refer to system components that are invisible to the user using the interface described here. However all backend components described here may also be visible and operable by the user according to embodiments of the invention. The representation generated by the image generator 108 may be based on a plurality of inputs including user input (e.g., via input devices 1136, FIG. 10). The user input is indicated by flow 151. Additional inputs to the avatar visual editor 106 may include a generic image of a human stored at the computing device 102 or a server with which the computing device 102 is in communication, other stored images such as logos and accessories, and other inputs. The image may be presented to the user to be previewed, and edited or modified using the visual editor 106 in response to input by the user 100 according to the user's needs. The user input 151 may be for example selected avatar properties which are supplied to the avatar visual editor 106. These are translated into an avatar data structure by editor 106 from which the data structure is output as indicated by flow 153 to the image generator 108. Thus the visual editor 106 may constantly or repeatedly inject translated user input into the image generator 108 that processes the avatar structured data to form a standard artificial image composite, or image file. From this image file an output representation is provided to be previewed by the user 100 as indicated by flow 155. The operations of image change or refinement by the editor 106 in response to user input 151, followed by generation of an altered representation for preview indicated by flow 155 by image generator 106, may continue until the user is satisfied with the avatar. An avatar image and metadata are output in flow 157 from the image generator 108 and input to a signature generator 110. This may occur for example after receiving confirmation or acknowledgement from user 100 that the representation is not to be further modified. Metadata may include for example visual information about the target such as shape, height, body build etc.

The signature generator 110 is according to embodiments of the invention a backend component which transfers the artificial image composite, or image file, into a signature. The signature may be a comparable unique mathematical e.g. digital model that represents the representation, e.g. avatar or the target human. Images from which signatures are generated are output in flow 157 by the image generator 108. The signature is output as indicated by flow 159 to a search system 112. The generation of the signature according to some embodiments of the invention is based on features of the representation that will be useful in distinguishing the target human from other humans depicted in images. According to embodiments of the invention the signature may include significantly less data than the image from which it was generated, even allowing for the fact that the representation, being itself processor generated, may be very simple and not contain as much data for example as a digital camera image.

One purpose of the search system according to embodiments of the invention is to use the signature to identify one or more humans in images, for example camera images such as in video footage, as candidates or possible matches for the target human represented by the avatar (e.g., all of the signature, avatar, and the particular image may represent the same human, such that that particular person or human is represented in or appears in the one or more images). This may be done by comparing the signature generated using the avatar with other signatures that have been generated using images such as camera images.

The search system 112 may be implemented at the computing device 102 or it may be implemented on a sever which may for example be remote from computing device 102 and be accessible to other computing devices on which similar searches may be carried out.

The inputs to the search system 112 include the signature generated using the processor generated representation or avatar and additional search query parameters or metadata which may for example be input by the user as indicated by flow 161. Examples of search query parameters include but are not limited to geographical area, selection of certain sources such as video sources, and time interval.

According to embodiments of the invention, the search system 112 fetches or retrieves the relevant other signatures according to the search query parameters. These other signatures may have been previously generated, indexed and stored, for example at a server. These other signatures may have been generated using images of humans extracted from images such as video or other camera footage. They are supplied to the signature comparer 120 as indicated by flow 162 along with the signature for the target human generated from the avatar, also referred to as the avatar signature. Thus the avatar signature is used to identify one or more of the humans in the video or other images as a candidate for the target human. The signature comparer is according to this embodiment a backend component used for comparing an avatar signature with a signature for a real human, e.g. taken from real video footage, and provide a score for each comparison, also called a match score or similarity score.

According to embodiments of the invention, this identification may be performed for example as follows: The signature comparer 120 outputs a score indicated by flow 164 for each comparison of an other signature with the signature for the avatar. This score may determine the extent to which the two compared signatures match and may be termed a match score. The signatures with the highest match scores are selected by the search system 112 and output at flow 166 to the computing device 102 where the corresponding images are displayed to the user as indicated schematically by screenshot 170. Screenshot 170 shows a plurality of images of humans from which the user 100 can select one or more which appear to be images of the target human. Thus the images displayed to the user in screenshot 170 show one or more humans who are candidates for the target human. According to this embodiment these candidates are automatically selected by comparison of signatures and according to embodiments of the invention a user can then decide which of those images in screenshot 170 show the target human. User feedback, such as selection of one or more images may be provided as indicated by flow 168.

According to some embodiments of the invention, the signature generated using the avatar or processor-generated representation may be used to identify humans in further images as candidates for a particular or target person or human, again optionally using signature comparison. Those further images may include for example images captured by video or other cameras at a future time. According to some embodiments of the invention, instead of or in addition to the avatar signature being used, the signature of an image selected by the user, for example from screenshot 125, is used to identify one or more humans in further images as candidates for the target human. Thus, according to embodiments of the invention, the avatar or processor-generated representation is only used in an initial search for a real image on which to base further searching.

Figure 2B:
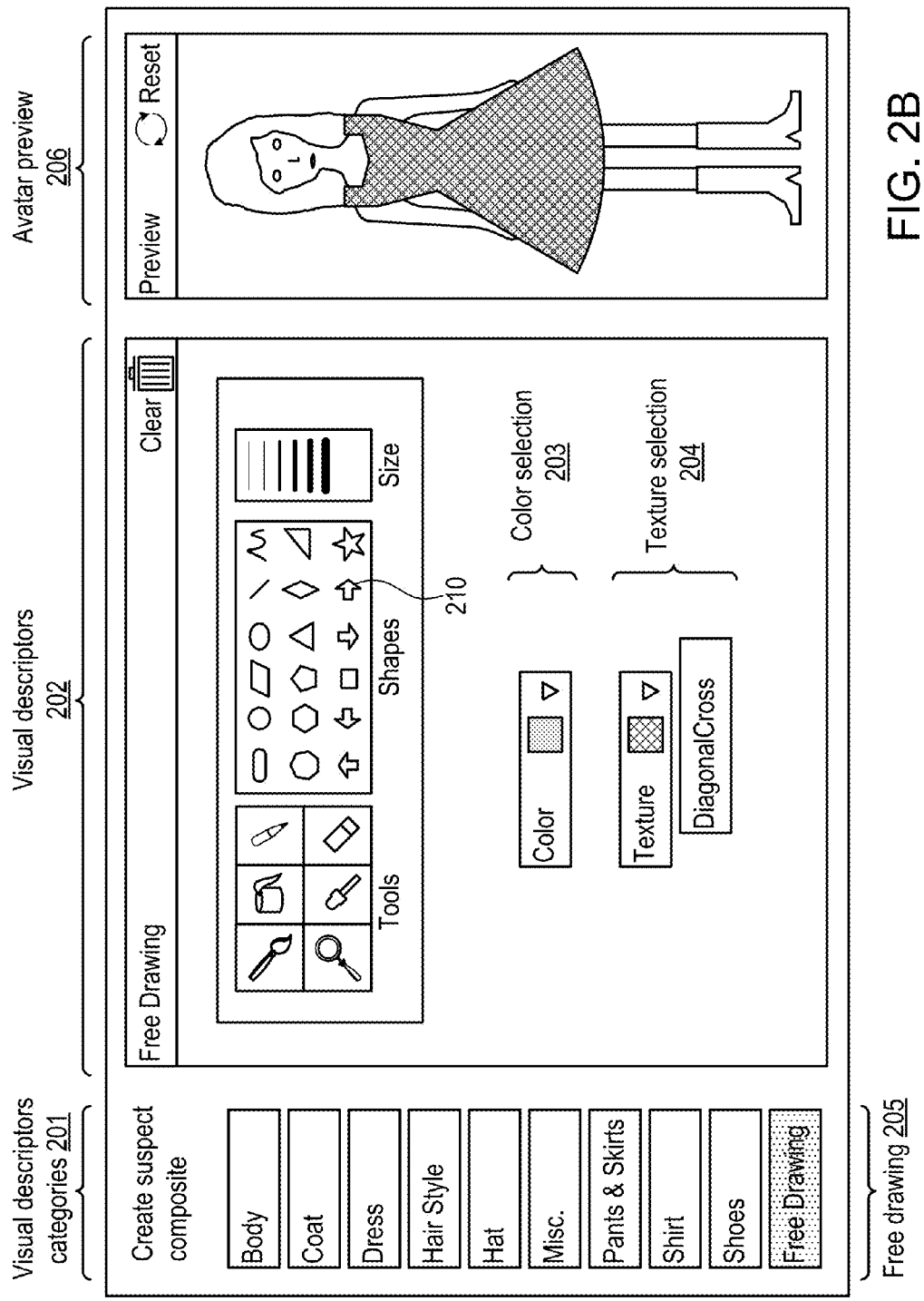
FIG. 2B shows another example of a GUI that might be presented to a user as part of a method according to embodiments of the invention.

Systems and methods for generating an avatar or image representing the target human according to embodiments of the invention will now be described in more detail. FIGS. 2A and 2B are examples of GUIs that might be presented to a user as part of a method according to the invention. This particular embodiment is aimed at identifying a suspect and is entitled "Create Suspect Composite" but it will be appreciated that the same principles can be applied to the identification of individuals or humans that would not be termed "suspects" such as missing persons.

The GUI shown in FIG. 2A provides various visual descriptors from which the user may make selections. The visual descriptors are shown as a list 201 on the left side of the GUI shown in FIG. 2A. In order to provide an easy to use and intuitive GUI, the visual descriptors may be organized into logical groups or categories. An example grouping may be as follows, the first part of which is visible in FIG. 2A (other visual descriptors and categories may be used):

a. Body—Contains different body shapes (big/small/child), skin color and height.
b. Coat—Contains different types of coats (short/long/kids/woman/man/safari).
c. Dress—Contains different types of dresses (short/long/wrap/A-line/halter).
d. Hair Style—Contains different types of hair styles (short/long/bald/crew cut/braids/ponytail).
e. Hat—Contains different types of hats (boater/trilby/beanie/sun hat/hood/baseball cap).
f. Pants—Contains different types of pants (short/long/jeans/tights/slim-fit/loose/suit).

g. Skirts—Contains different types of skirts (long/knee/short/wide/tight).
h. Shirt—Contains different types of shirts (long/knee/short/no sleeves/slim-fit/regular-fit).
i. Shoes—Contains different types of shoes (flats/boots/mule/loafers/high-tops/flip-flops)
j. Accessories—Contains different types of accessories (bags/tie/pantyhose/gloves/suitcase/umbrella).
k. Logo\Brand—Contains different types of logos and brands (Cola/Macdonald/Starbucks/NIKE)

It will be appreciated that the foregoing list of visual descriptor categories 201 is just one example and other embodiments of the invention may use more or fewer categories and more or fewer items in each category. Furthermore some of the items listed in particular categories may instead or additionally be listed in one or more other categories.

FIG. 2A shows an example of a screenshot such as might be visible on display 101 in which the category "Dress" has been selected. Within each category further choices may be available to the user as indicated in the area 202 of the GUI. For example, for one or more of the visual descriptor categories in the list 201, a number of types are provided from which the user may select. These may be provided in the form of images rather than text. Thus as shown in FIG. 2A images of four types of dress are available to select from. For one or more of the categories, and optionally for one or more of the types within a category, the user is able to select one or both of color and texture. Thus as indicated in FIG. 2A, the color selection is indicated at area 203 and the texture selection is indicated at area 204. In the illustrated example, a sleeveless dress has been selected in red and a diagonal cross texture has been selected. According to embodiments of the invention, any visible color may be supported by allowing the user to visually define the hue, saturation and brightness level and then select the RGB (Red, Green, Blue) representation of the color. However in the illustrated example the user is simply presented with predefined colors from which to choose and this has been found to produce useful results.

FIG. 3 shows by way of example a list of cloth or fabric textures that might be provided for a user to choose from. It will be appreciated that more or fewer textures may be provided optionally including other textures than those shown in FIG. 3. Also the number and types of texture may depend on the descriptor category to which it applies. Cloth or fabric textures may be applied to clothing worn by or accessories associated with the target human.

In addition to selecting items in the visual descriptor categories, the user may be able to add free drawing features as indicated by area 205 in FIG. 2A. FIG. 2B shows an example screen shot similar to FIG. 2A except that here the "free drawing option has been selected. This facility may provide a number of tools, generally indicated as 210, of the kind known in the art to enable the user to paint over the avatar image and optionally on every part of the image. This may be achieved in a number of ways, for example by one or both of scribbling a sketch and adding simple geometry shapes. Non limiting examples of shapes might include dots, lines, rectangles, triangles, ellipses and polygons. For added drawn items the user may have the opportunity to select color 203 and texture 204 as with the example of dress selection shown in FIG. 2A.

At each stage in the process of selecting a visual descriptor the user selection is translated by the avatar visual editor 105 into a composite image or representation which may be presented for the user to preview. This is indicated at 206 in FIG. 2. It will be seen that in this example prior to choosing "Dress" the user has selected the visual descriptor categories body, hair style, boots and accessories and within one or more of these categories the user may have made a selection of color or texture or both. The selection of visual descriptor may be carried out in any order. For example a dress may be selected first and then a body. The dress may then be sized to fit the chosen body. This enables a user to add descriptors according to the order in which details of a person are remembered and may lead to a more intuitive user experience than if the visual descriptors are required to be selected in a pre-set order.

Each time a representation or preview avatar 206 is displayed, the user may make modifications, either by choosing an additional visual descriptor category or by modifying a visual descriptor previously selected. For example a shade of hair color previously selected may be modified. Thus the operations of generation of representation preview and modification in response to user input, described in connection with FIG. 1, may be repeated indefinitely. In practice the process may continue until the user approves the avatar for use in signature generation. At each iteration of preview-modification, depending on the skill of the operation or the accuracy of remembered details, the representation should more closely approximate the human target.

Once the avatar is approved by the user or is otherwise deemed ready, it can be used for searching amongst images for humans of similar appearance which can be identified as candidates or possible matches or equivalents for the target human. A number of candidates may be identified from which a smaller number may be selected. The smaller number may be selected by the human operator. This smaller number of candidates may include images of different humans or different images of the same human. The search may be limited by query parameters.

Figure 4A:
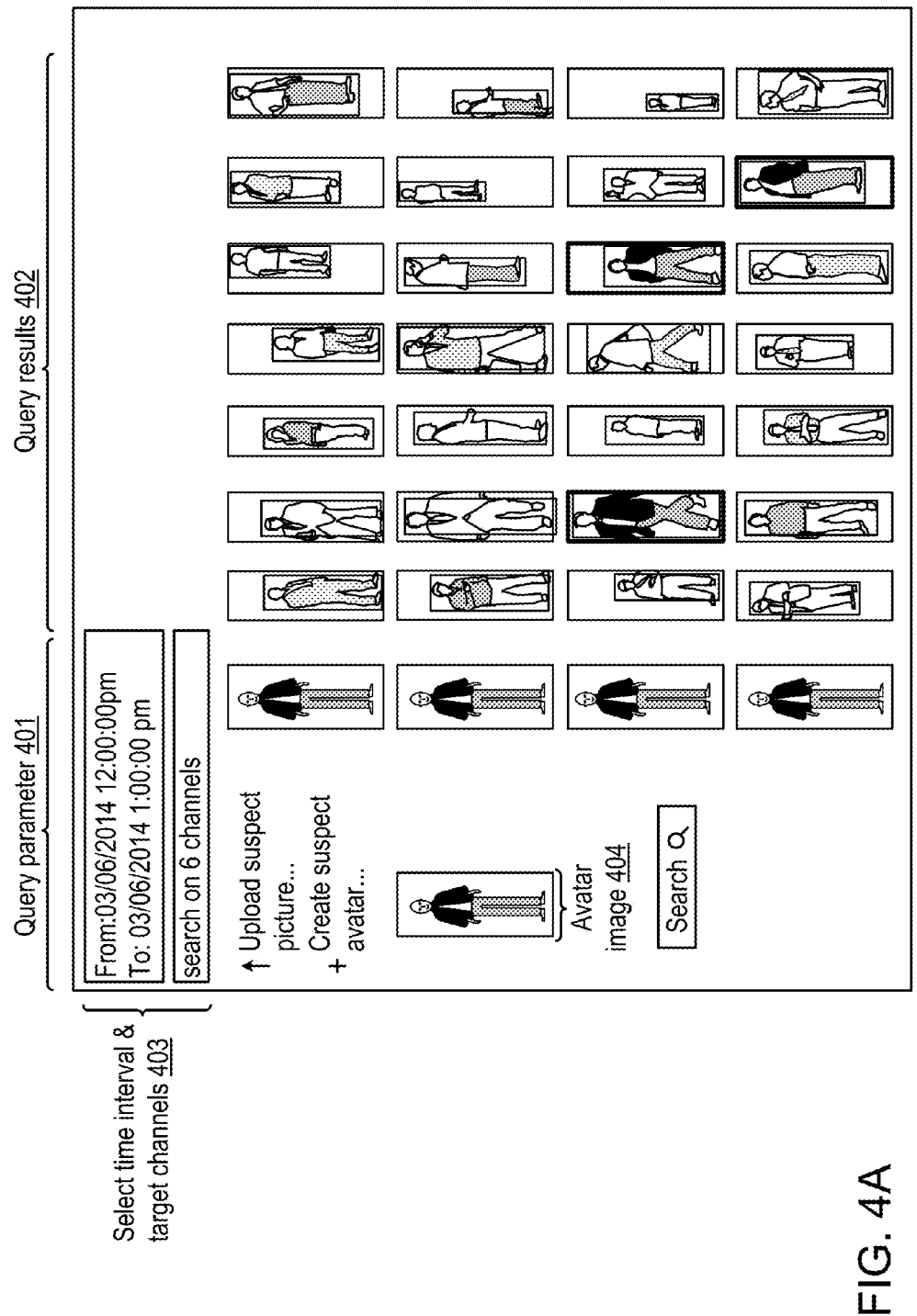
FIG. 4A shows an example of a GUI for input of search properties according to embodiments of the invention.
Figure 4B:
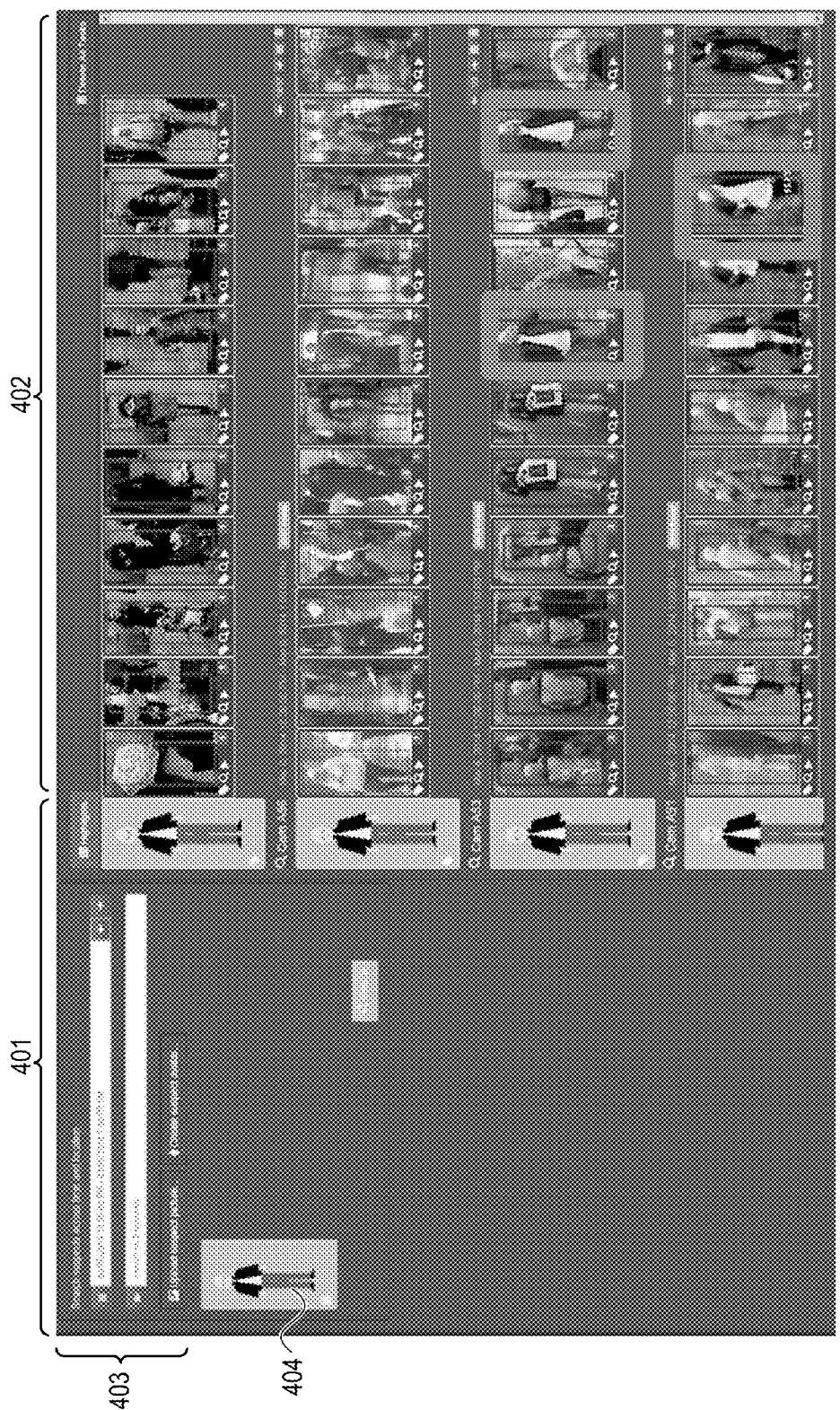
FIG. 4B is a view similar to FIG. 4A showing data from an experimental implementation of the invention.

FIGS. 4A and 4B illustrate examples of a GUI that might be used to enable a user to input properties representing a desired query or search. The possible query or search parameters are shown on the left hand side in FIG. 4A in an area indicated as 401. One of the search parameters is the avatar or representation of the target human 404. This might appear automatically in the GUI shown in FIG. 4A once it has been approved following the operations described in connection with FIGS. 2 and 3. Other possible search parameters include Time interval—User selects the time interval to search on.
Target channels or geo location area: User selects the target channels, e.g. certain video surveillance cameras, to search on.
Additional search properties.

In the example GUI shown in FIG. 4A, for each selected channel those images of humans with the highest match score according to the search parameters are displayed, for example in order of score. FIG. 4A shows the results from four channels indicated at area 402. Here images are presented in match score order for each channel, with the images having the highest match score shown on the left. The images may be presented as thumbnails or other reduced or compressed versions of images that may be selected for more detailed viewing. The user is able to view the images and indicate images which show the human target. In the illustration of FIG. 4A selected images are enclosed by a bold or colored rectangle.

The generation of the avatar and the generation of the signature from the avatar according to embodiments of the invention will now be described in more detail.

As noted above the avatar visual editor may take the form of a user interface (UI) component that enables a user to build a visual representation of virtual avatar. This UI may be dynamically built from a list of visual descriptors which may be grouped in a logical manner. Each group may be realized via a data model which in this embodiment is called "visual descriptor group model". According to embodiments of the invention this group model may contain the following structure (other structures may be used):

| Property | Description | Type | Sample |
|---|---|---|---|
| Description | Human readable description of the visual descriptor group | String | "Hats" |
| Default Location | The default 2D location of elements from this visual descriptor group. | (X, Y) | (50, 30) |
| Default Order | The default z-order of elements from this visual descriptor group. | Integer | |
| Is Support Color | Do elements from this visual descriptor group support color customizations? | Boolean | true\false |
| Default Color | The default color of elements from this visual descriptor group. | RGB HEX | #FFFF00 |
| Default Texture | The default texture of elements from this visual descriptor group. | Texture enumeration | Integer |
| Default Texture Color | The default texture color of elements from this visual descriptor group. | RGB HEX | #FFFF00 |
| Is Support Texture | Does elements from this visual descriptor group support texture customizations? | Boolean | true\false |
| Required | Are elements from this visual descriptor group required in every avatar? | Boolean | true\false |
| Default Part | The default object used to represent visual descriptor element in this group | Visual Descriptor object | |

Each avatar part may be realized via a data model which in this embodiment is called a "visual descriptor model" which may contain the following data structure (other or different structures and data may be used):

| Property | Description | Type | Sample |
|---|---|---|---|
| Description | Human readable description of the visual descriptor element | String | "Baseball cap" |
| Location | The location of this visual descriptor element. | (X, Y) | (50, 30) |
| Order | The z-order of this visual descriptor element. | Integer | |
| Color | The color this visual descriptor element. | RGB HEX | #FFFF00 |
| Texture | The texture of this visual descriptor element. | Texture enumeration | Integer |
| Image | The default image used to represent this visual descriptor element. | Visual Descriptor object | Baseball_cap.png |

According to embodiments of this invention, the user may select a list of visual descriptor elements that represents the human target needed for the search. This list is known as the structure definition of the avatar. This structure representation is useful for allowing maintainability of the avatar or representation. This definition allows the user to modify, save, transfer and share the avatar across time and other users of the system. The data structures discussed above do not include freehand drawing. If the possibility of freehand drawing is provided, it may be saved as transparent image layer additional to the data structure shown by way of example above.

Figure 5:
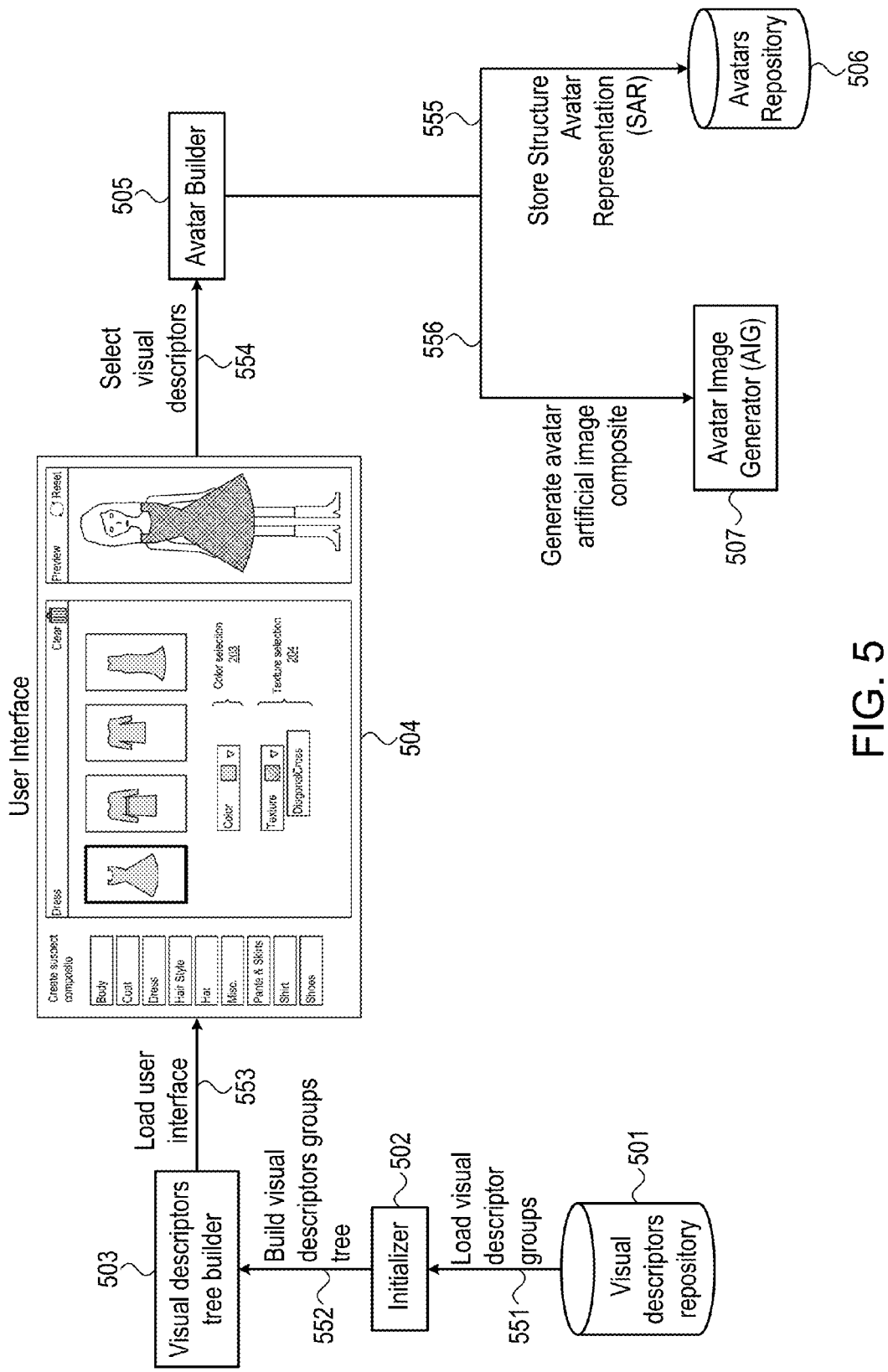
FIG. 5 shows the architecture of an avatar visual editor and main data flows according to embodiments of the invention.

FIG. 5 shows an example architecture for the avatar visual editor and example main data flows according to embodiments of the invention. In the embodiment of FIG. 5 a list of visual descriptor groups is stored in a visual descriptor repository 501, which may for example be web based. This may be realized by a file system or any commercial or proprietary database. The repository 501 may also store the base images for each visual descriptor. Thus to take the example of the visual descriptor "dress", images of the four dresses from which the user can select as shown in FIG. 2A may also be stored in the repository 501. Data from the repository 501 is supplied to initializer 502 as indicated by flow 551. The initializer 502 according to embodiments of the invention is an interface to the repository 501. It may retrieve a raw list of visual descriptors from the repository as indicated by flow 551 and provide them to visual descriptors tree builder 503 as indicated by flow 552. The visual descriptors tree builder 503 may then build a visual descriptor group tree. In the visual descriptor group tree builder 503, groups of visual descriptors and elements within each group are organized in a tree structure in order to facilitate selection by the user. The building of the tree structure may complete the preparation of a UI which can then be loaded, for example to a computing device 102 as indicated by flow 553, and shown on a display 504. At this point the UI presents the available avatar elements and asks the user to select the elements that match the human target.

The user, using the UI via the display 504, may input (e.g., via input devices 1135, FIG. 10) a selection of avatar elements that represent the human target as described above in connection with FIGS. 2 and 3. The user's input selection is passed to an avatar builder 505 as indicated by flow 554. The avatar builder 505 processes data representing the user's selection to construct an avatar. As will be appreciated from the description of FIG. 2, this construction of an avatar may be a modification of a previously constructed avatar. The previously constructed avatar may be a default initial avatar presented to the user for modification or it may be an avatar constructed from a previous selection of visual descriptors by a user. After the construction, the avatar builder 505 may forward data representing a constructed avatar, as indicated by flow 555, to an avatar repository 506, which may be realized by a file system. The forwarding of a constructed avatar to the repository may occur on each construction of an avatar or it may occur in response to a user confirmation, for example that no other modifications are required during the current user session. The avatar may be stored in the repository 506 in the form of a data object. Also after the construction of an avatar, the avatar builder 505 may send a request indicated by flow 556 to an avatar image generator 507 in order to generate the avatar image representation. This avatar image representation is the output to the display 504 as indicated by flow 557 where it can be previewed by the user.

Figure 10:
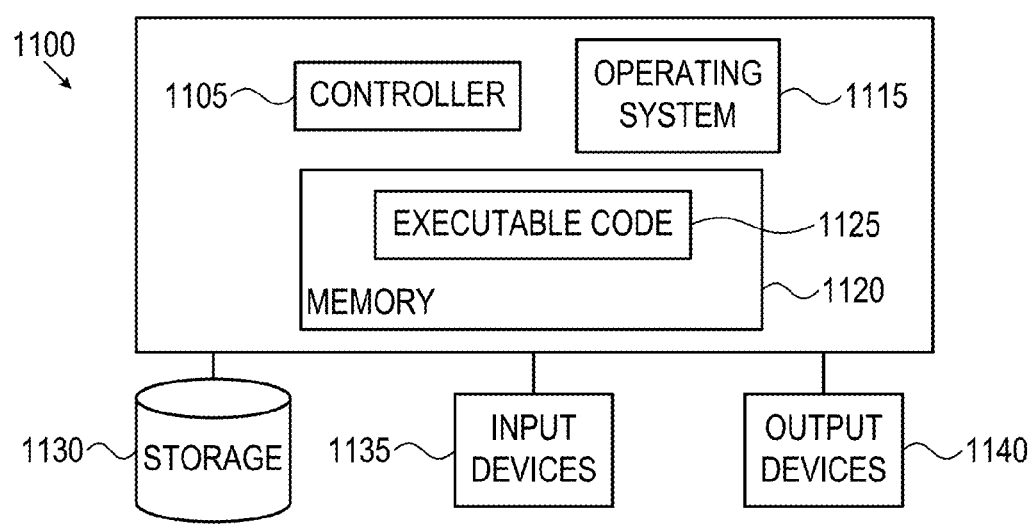
FIG. 10 is a block diagram of a computing device that may be used in embodiments of the invention.

All of the components of the system illustrated in FIG. 5 may be implemented on a personal computing device, and/or a devices such as shown in FIG. 10. However it may be convenient according to some embodiments of the invention for components of the system to be distributed across multiple devices, for example including a server.

An example architecture for an avatar image generator according to embodiments of the invention will now be described with reference to FIG. 6. The image generator 108 shown in FIG. 1 may in some embodiments include an image generator of the kind described with reference to FIG. 6.

The avatar image generator may include a backend component or module of a system according to the invention that transfers avatar structure data into an image file, for example a standard artificial image composite. The avatar image generation may comprise a sequence of image processing operations.

The process of generating an avatar image according to embodiments of the invention may commence with the reception as input of a build image command, indicated by operation 601. This may be received from the avatar builder 505 shown in FIG. 5, and may comprise a structured avatar representation. This structured representation may comprise a list of avatar parts. Each part may for example be represented by metadata (such as but not limited to color and texture, which may be default metadata or may be based on selection by the user) and an identification of a base image that indicates its geometry shape. Next the structured representation is processed by an avatar painter as indicated by operation 603. This operation may include successive iterations for respective avatar parts in which color and texture are applied using pixel-level image processing. The result of this operation may be a list of avatar parts with added colors and textures. This list of parts may be transferred to an avatar image combiner for combining as indicated by operation 605. The combiner may retrieve the base images or avatar parts, for example from repository 501 and use metadata, provided as part of the build command in operation 610, in order to combine the avatar parts into an image, which may be termed a composite image. The metadata may include customizable information such as scale, angle, exact location and more. An example of a composite image is indicated at 650. This image may be in the form of an RGB frame similar to a digital photographic image. Next the image composite is subject to mask generation as indicated by operation 607. This operation results in a mask image, an example of which is shown at 601, which may be used by the signature generator 110 shown in FIG. 1, for example to extract the object geometric shape or to perform other operations as part of the signature generation. The operations shown in FIG. 6 may culminate with the generation, indicated as operation 609, of what may be called an "avatar package" comprising data for generating the composite image 560, data for generating the mask 651, and related metadata. This related metadata may include additional information about the human target such as height, body build for example. The metadata may include other information which is not self-evident from the avatar once generated. It will be appreciated that according to embodiments of the invention each of the operations shown in FIG. 6 may be performed in respective processing modules.

An example method of generation of a signature for an avatar representing a human target according to embodiments of the invention will now be described. As noted above, the avatar signature generator may be a backend component that transfers an avatar image composite into a unique mathematical signature that represents the avatar. That signature may be compared with others to derive a similarity score.

According to embodiments of the invention the signature may include two main parts, for example color features and texture features, and two signatures similarly comprising the same parts, for example color features and texture features, may be compared to derive a similarity or match score. A signature may include more features based on additional or alternative attributes to color and texture and be compared with a signature based on the same attributes. Alternatively separate signatures for texture and color and any other suitable attribute of an image of a human may be generated and each compared with another signature for the same attribute in order to derive a score for that attribute. One such comparison may be sufficient to identify candidates for a target human but the results of several comparisons based on different attributes of two images may be combined in the process of deriving a score for the comparison.

Figure 7:
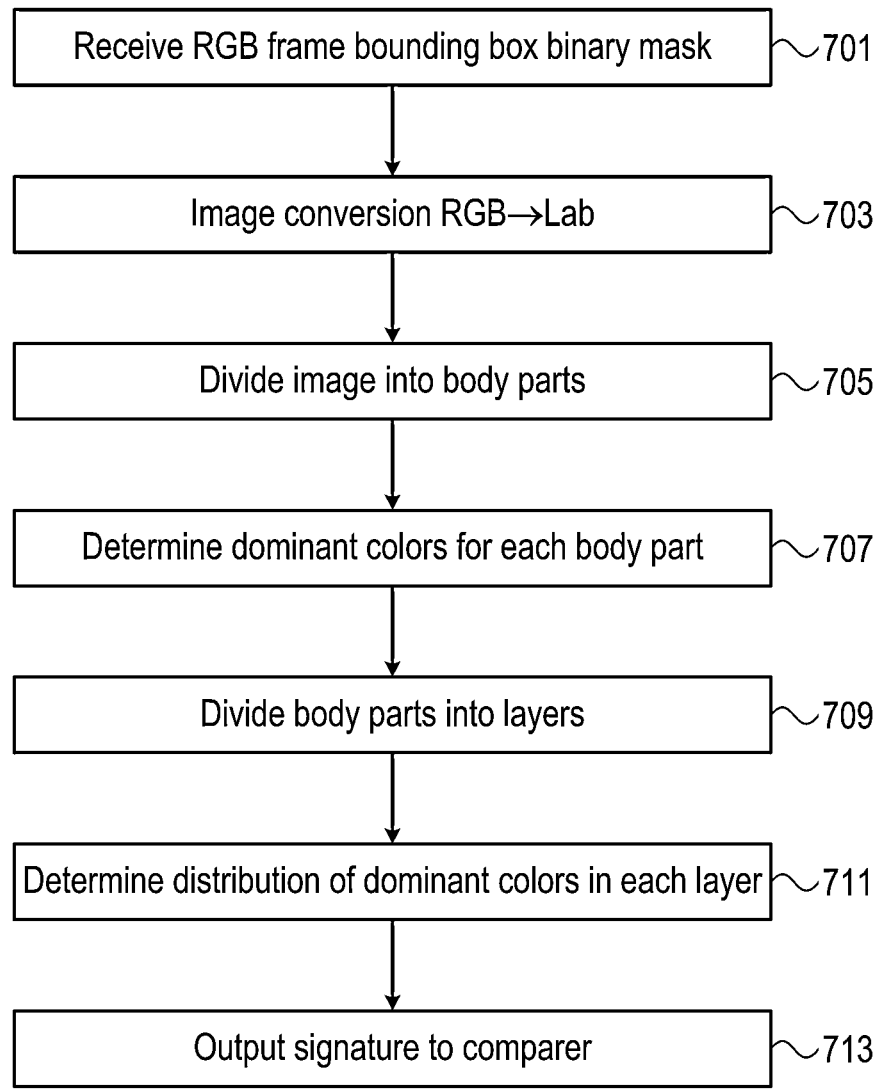
FIG. 7 is a flowchart illustrating the generation of a signature for an image or representation according to embodiments of the invention.

A method of generation of a signature comprising color features, according to some embodiments of the invention, will now be described with reference to FIG. 7. It should be noted that the following method may be used to generate a signature from a camera image and also to generate a signature for an avatar image.

The signature generator 110 of FIG. 1 may include one or more processing devices which take as input data, as indicated at operation 701:

An RGB frame representing the avatar

A bounding box in the frame containing a human object (not required for an avatar but may be useful for a camera image, as can be seen for example in FIG. 4A where some of the human figures do not fill the whole image)

Figure 6:
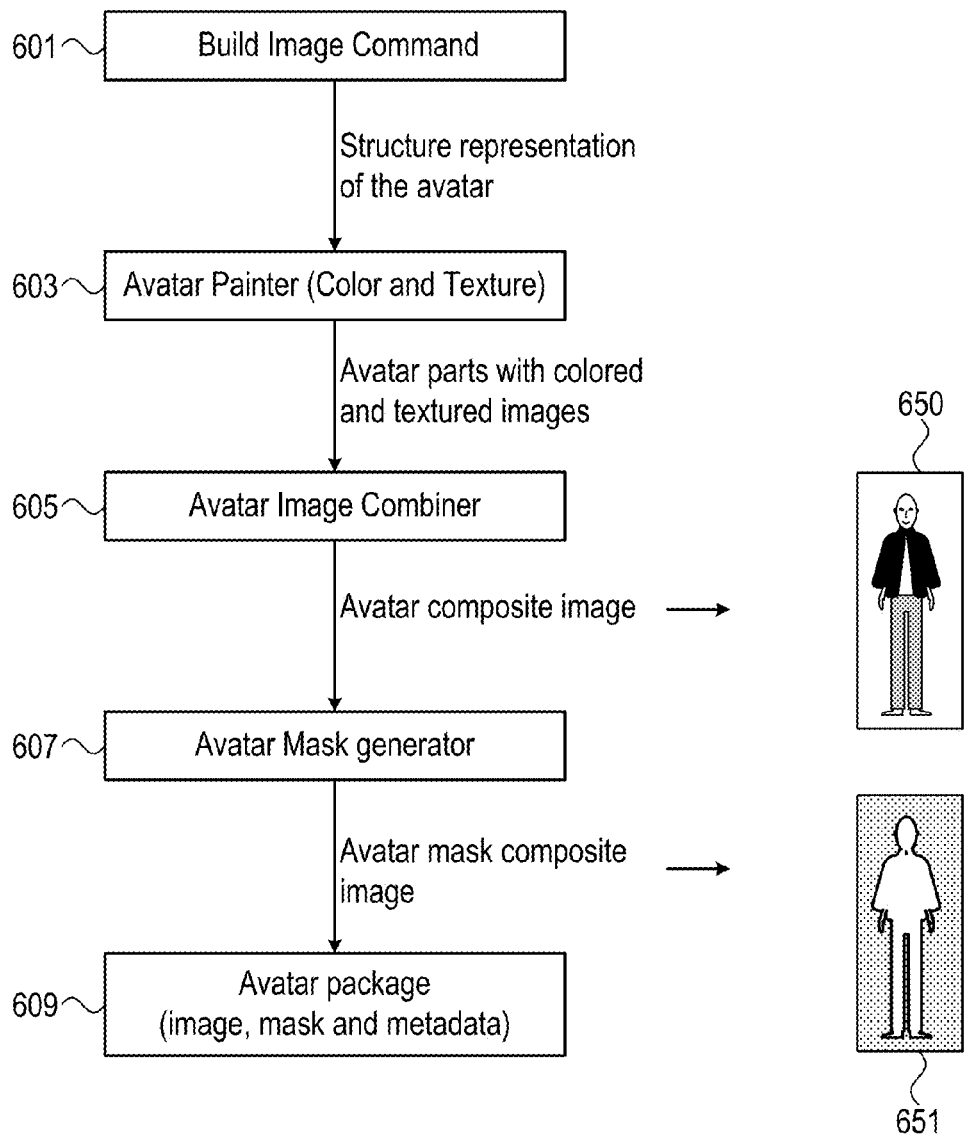
FIG. 6 shows an example avatar image generation architecture and main data flows according to embodiments of the invention.

A binary mask (silhouette) separating the human foreground from the background, for example mask 651 as shown in FIG. 6.

It will be appreciated that the bounding box and the binary mask may not be required in the case of an avatar. For example a background may not be used for an avatar.

According to embodiments of the invention this input data is processed using the following operations:

Firstly at operation 703 the image is converted from RGB color space to Lab color space using any method as known in the art. Lab space is preferred but not essential since it more readily represents colorimetric distances between colors.

Next at operation 705 the image is divided into body parts. This may be done by determining the Y coordinate of the waist. Thus two body parts are obtained: torso and legs. The determination of the Y coordinate of the waist can be achieved in any known way. One possibility is "asymmetry based partition" described in the article "Person Re-Identification by Symmetry-Driven Accumulation of Local Features", by M. Farenzena, L. Bazzani, A. Perina, V. Murino, M. Cristani. IEEE 2010. It will be appreciated that according to other embodiments the body can be separated into more parts but two has been found to be sufficient.

Next at operation 707, dominant colors are determined for each body part. This involves finding a limited number of dominant colors for each body part, e.g. on the head and torso respectively. Suitable numbers have been found to be at most 4 dominant colors on the torso and at most 3 dominant colors on the legs. The finding or determination of dominant colors, for example those that occur most frequently, may be performed by clustering for each body part. Any suitable known algorithm may be used for this clustering. For example it may be done using a K-means algorithm, otherwise known as K-means clustering. A K-means algorithm divides an object into regions, each with a different homogeneous color, which may be taken to be the dominant colors. In one embodiment, the generation of each signature includes identifying a predetermined number of dominant colors in the representation or image and determining a distribution of only the dominant colors.

Next at operation 709 each body part is divided into layers. 3 has been found to be a suitable number of layers for each of the torso and legs although different numbers of layers may be used. These may be horizontal layers (e.g. by Y axis) and may be of even depth. For the example of 3 layers for torso and legs the result is a total of 6 layers. Depending on how the body is divided into parts, this division into layers might not be necessary or only some body parts might be divided into layers.

For each dominant color its distribution, also termed "appearance" or "weight", on the different parts of the image is next determined at operation 711. In the example embodiment described with reference to FIG. 7, the distribution of each dominant color on the layers is determined, for example relative to the area or width of the layer. For example, for each layer the appearance or weight of that color on that layer may be determined, such that the weights of each layer sum up to 100%.

Using the example parameters above, the result is a signature or data set that is a set of at most 7 colors in Lab color space, with for each color the appearance of the color in the 6 layers, relative to the layer's area. This is output to the comparer, e.g. comparer 120 of FIG. 1, at operation 713.

As noted in connection with FIG. 1, the output of the signature generator is applied to a comparer 120, possibly via the search system 112. The signature generator may be a backend component that is used for comparing an avatar signature with a real human signature (taken from real video footage) and providing a score for each comparison, called a match score or similarity score.

Figure 8:
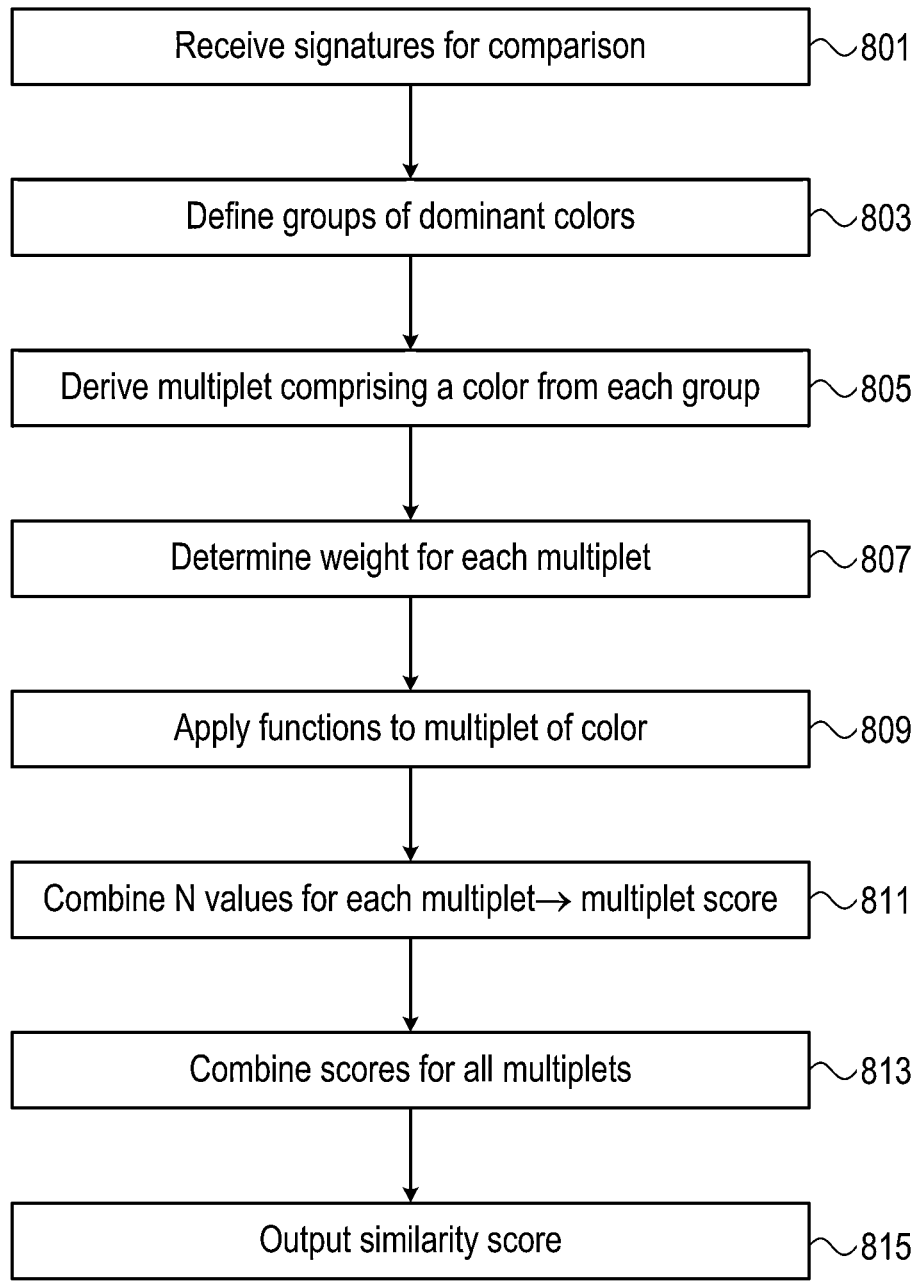
FIG. 8 is a flowchart illustrating the comparison of two signatures according to embodiments of the invention.

Methods of comparing two signatures according to embodiments of the invention will now be described with reference to FIG. 8.

The comparer 120 may take as its input two signatures, denoted $s_1$, $s_2$, of respective objects (e.g., persons or humans), and output the similarity score. The method of comparison now to be described may be used to compare the signature of an avatar with the signature of a real human for example based on a camera image. It may also be used to compare the signature of one real human with the signature of another real human. The input of two signatures to the comparer is indicated at operation 801 in FIG. 8.

A single color seen on one camera may transfer to almost any other color on another camera with different illumination. This may lead to a low similarity score for two differently lit cameras viewing the same human target. However a pair of colors preserves some implicit relationship, even if the illumination completely changes. The signature generation and comparison process may be devised to determine this implicit relationship between pairs of the chosen colors. Given this relation for pairs of colors, since an image of most people will contain at least two colors (clothing, skin), this relationship may be used to identify a human represented by the avatar from images such as camera images. According to embodiments of the invention this identification, based on a comparison of respective signatures, may be done using groups of colors. The following example uses groups of four colors or "quartets" derived from the signatures although it will be appreciated that larger groups may be used. In the following humans are referred to as objects since the basic comparison method is applicable to all kinds of images. Each quartet may include a pair of colors from the first image and a corresponding pair of colors, e.g. from the same parts such as head and torso, from the second image. It will be appreciated that the comparison does not have to be based on pairs of colors and could be based on trios or larger groups of colors, a first group from one image and a second group from the second image. Also the corresponding "parts" of the respective images may be narrowed down to e.g. corresponding layers or other regions in the respective images.

In order to generate a quartet according to embodiments of the invention, firstly at operation 803 groups of dominant colors are defined in the two signatures to be compared, four groups of colors being chosen in the following example. For example, two groups for the first object and two for the second. Each group may correspond to one of the parts into which the body has been divided, for example torso and legs as suggested above. According to embodiments of the invention, the same number of groups of colors is defined for each signature.

Let $m_1, n_1$ represent the number of dominant colors above and under the waist respectively in the first object. Thus in the example discussed above $m_1, n_1 = 4, 3$. Let $m_2, n_2$ number of dominant colors above and under the waist in the second object. Four dominant colors are denoted a "quartet", if exactly one color is chosen from each group. According to other embodiments of the invention, the number of groups may be six, three from each object, and thus by choosing a color from each group a set of sextuplets may be defined. A selection of one color from each group may be termed a multiplet. If the same number of groups is chosen for each signature, each multiplet will include an even number of colors.

At operation 805, multiplets are generated or derived each comprising a color from each group. According to embodiments of the invention all possible multiplets are generated. Each multiplet may include pairs of dominant colors from two images to be compared, and each pair may include a respective dominant color from corresponding parts of each of the two images. Thus for example a multiplet may include a dominant color from layer 10 in the first image and a dominant color from layer 10 in the second image.

If all quartets from the 4 groups are compiled this gives a total $Q = m_1 n_1 m_2 n_2$ quartets, or different combinations of one color from each group. The multiplets may be subject to a number of operations in order to determine a similarity score. Examples of such operation according to embodiments of the invention are now described.

Each quartet q has a weight $a_q$, which is equal to the product of weights (or appearances) of its 4 dominant colors, stored in the signatures. Thus, at operation 807, the weights for each multiplet are determined.

Next, at operation 809, a number N of functions is applied to each multiplet. The color in each multiplet may be represented by its coordinates in Lab color space. According to embodiments of the invention the coordinates of the colors in other color spaces such as HSV (hue, saturation, value) may also be used. The inputs to one or more of the functions may include the weights, $a_q$. For the example of four dominant colors, the signatures may be compared by empirically choosing an number N of functions $f_i(q) = (C_1, C_2 C_3, C_4)$ whose input is four colors $C_1, C_2 C_3, C_4$ (quartet q). $C_1, C_2$ were picked from one object, $C_3, C_4$ were picked from the same layer in another object. Thus $C_1$ matches to $C_3$, and $C_2$ matches to $C_4$ in terms of body part. The values of $C_1, C_2 C_3, C_4$ may be in one color space, e.g. Lab. According to embodiments of the invention functions may be applied to values in multiple color spaces. Thus for example the process of FIG. 8 may additionally include an operation, between operations 807 and 809, of converting the dominant colors to another color space such as HSV to provide an additional set of values for $C_1, C_2 C_3, C_4$ to which the N functions of operation 809 may be applied.

As functions polynomial, logarithmic and exponential functions of the colors and the distances between the colors may be used for example, and also different combinations (products) of the functions. Additional or alternative functions may include taking chrominance vectors in the 2D space ab (of Lab) between the matching colors inside each pair and calculating the correlation between the two vectors (or cosine of the angle between them).

This way, given a quartet, the result is N numbers, obtained by applying the N functions on the 4 colors. Examples of functions include:

$L_1$-$L_3$, $b_1$-$b_3$, $a_2$-$a_4$, $(L_1$-$L_3)^2$, $\exp(b_2$-$b_4)$, $\log(a_1$-$a_3)^2$, $(L_1$-$L_2)(L_3$-$L_4)$ where L,a,b are coordinates of colors $C_1$, $C_2$ $C_3$, $C_4$ in Lab color space. During a training stage a linear support vector machine (SVM) may be used to determine a weighting factor $w_i$ for each function i.

The comparison may be carried out for example as follows: For every multiplet (e.g. quartet): apply N different functions on the multiplet's colors, obtaining N values, as indicated by operation 809. The functions represent a similarity between the corresponding colors of the multiplet according to different criteria, for example different color spaces.

The N values may be combined, e.g. summed, at operation 811 to derive a score for each multiplet, optionally using one or more weighting factors depending on the respective function. For example this may be done using a target function learned by SVM as a linear combination of the N values. Thus a quartet's score would be obtained:

$$S_q = \Sigma^N w_i f_i(q)$$

The scores for all multiplets are then combined, e.g. summed, at operation 813, to derive an overall similarity score. This combination may use the weight for each multiplet determined at operation 807.

For the quartet example the operation may be: Sum all quartets' scores, weighting them according to their appearances (weights) $a_q$ according to the two signatures. Obtain the comparison score based on the color features:

$$\text{Color Score} = \Sigma^Q a_q S_q$$

It will be appreciated that the generation of the signatures is not limited as to numbers of body parts, layers, dominant colors and other factors. However the smaller the numbers chosen, the less processing power is required for the comparison and the faster results are available. The numbers used above by way of example are based on experimental data and have not been reduced to simplify the explanation. However as will be explained below they have been found to lead to very useful results.

It will be appreciated that the color score is a measure of the extent to which the two signatures match, or measure of similarity, based only on the color distribution. This alone may be sufficient for the selection of candidate matches to the human target amongst signatures generated from real images.

Additionally or alternatively two signatures may be compared based on other respective attributes. Another method of generating signatures for images of humans will be discussed in more detail below with reference to FIGS. 13 to 22.

As noted above, systems for identifying particular persons or humans from images of multiple humans are already known. The ability to search for a person using an artificial image or avatar as described above may be integrated into a known system to provide a user with an additional optional method and system for generating a reference object against which to make a comparison. Thus, whereas in an existing system a reference object might be derived from a photograph, for example, according to embodiments of the present invention the reference object is an avatar.

Figure 9:
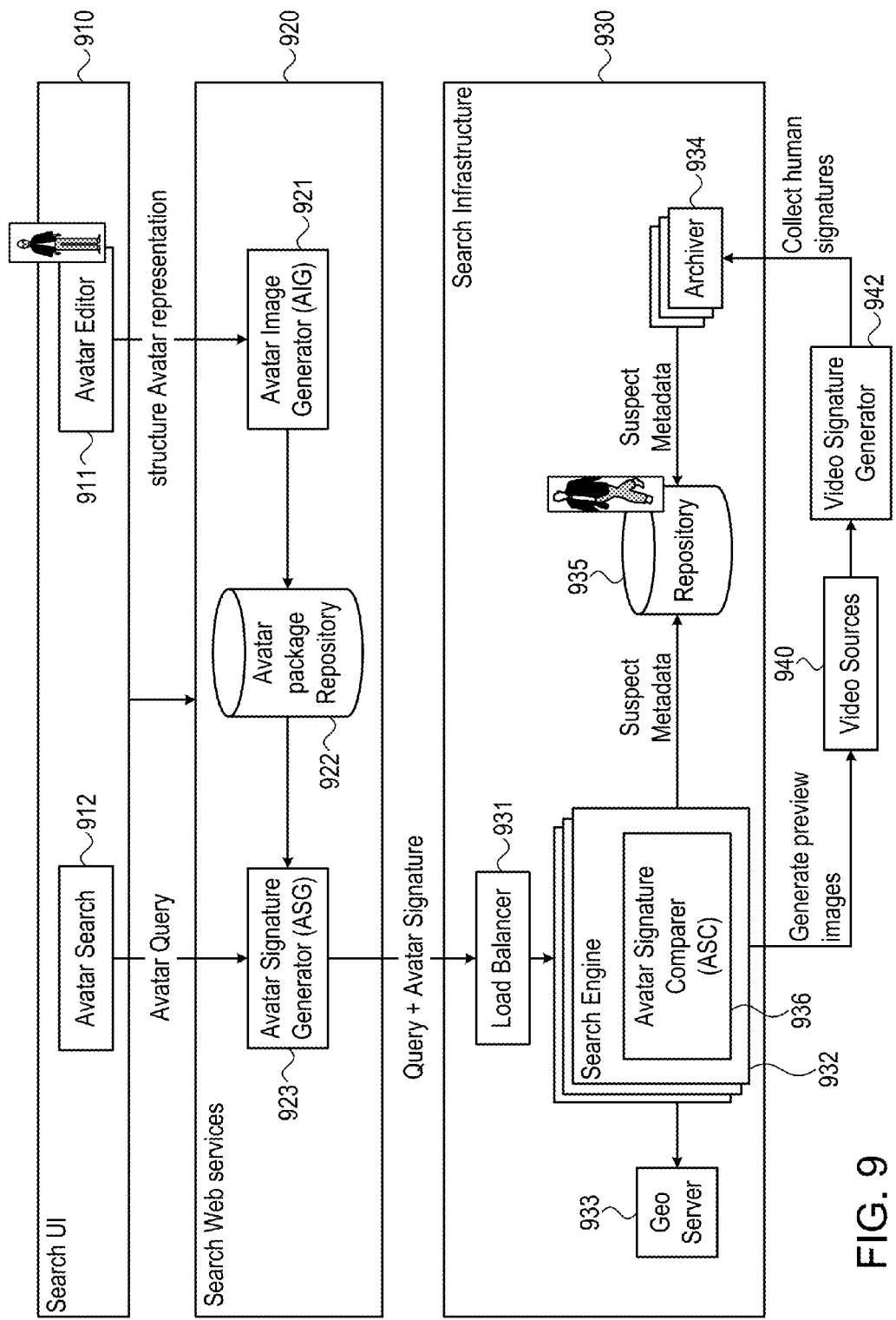
FIG. 9 is a block diagram showing the main components of an overall search system according to embodiments of the invention.

The components of the system shown in FIG. 9 according to embodiments of the invention include a user interface 910, search web services 920, search infrastructure 930 and video sources 940. The video sources may include any sources of video images such as but not limited to video surveillance cameras which may be continuously generating live images, or repositories of recorded video information, or both. In this embodiment the user interface includes two components, an avatar editor 911 via which a user is able to create an avatar representing the target as explained above in connection with FIGS. 2 and 3, and an avatar search interface via which the user can input search parameters as described above in connection with FIG. 4. The avatar editor user interface can be integrated as part of an overall search UI or can be launched as a standalone UI module. The user interface components may be implemented in a computing device, such as a personal computing device.

According to embodiments of the invention, the functions of the avatar image generator and the avatar repository (items 506 and 507 in FIG. 5) as well as an avatar signature generator are remotely hosted, for example on one or more servers to which the user interface gains access, for example via the internet. Thus in the system of FIG. 9, the search web services include avatar image generator 921, avatar package repository 922 and avatar signature generator 923. The avatar editor 911 output "Avatar Package" is saved in dedicated repository 922.

The search infrastructure 930 according to embodiments of the invention includes a load balancer 931 via which a search query including an avatar signature, received for example from avatar signature generator 923, are input to a search engine 932. The search engine may output information to a geo server 933. The geo server 933 may for example determine the next camera, or set of cameras, on which a search should be based. The input to the geo server 933 may for example be a geographical limitation defined in the search query or the location, and possibly also time, where the target has just been identified by a user, or any combination of such input information. Images from video sources 940 are supplied to a video signature generator 942 which generates signatures from video images in a similar manner to that in which avatar image generator generates avatar signatures from avatars. An archiver 934 forming part of the search infrastructure collects human signatures from video signature generator 942 and builds a collection of video signatures with associated metadata in repository 935 which are then available for comparison with avatar signatures.

Once user requests to initiate an avatar search, she can select an avatar from the avatar repository or create a new avatar and use it on-the-fly. Upon initiating a new avatar search, the Avatar signature generator 923 retrieves the avatar package selected by the user from the repository 922 and outputs a comparable unique avatar signature to the search infrastructure 930.

The avatar signature is injected to the search engine 932 and processed by the avatar signature comparer 936, in this embodiment forming part of search engine 932, in order to find a match at the repository 935 according to the query parameters. The search engine 932 may then send a request to the video sources 940 in order to generate the images, e.g. thumbnails, which most closely match the signature. In this connection it should be noted that according to embodiments of the invention, the repository 935 may include signatures without the corresponding images in which case it will be necessary to request the images from a video source. According to other embodiments, depending for example on the system architecture and sources used, images may be held in repository 935. The result of the search for the images with the most closely matching signatures, or similarity scores, may be a set of images ordered according to similarity score as discussed above with reference to FIG. 4A.

All of the components or modules illustrated in FIG. 9 may be web based. Alternatively some of the components or modules may be implemented on a user computing device.

Figure 19:
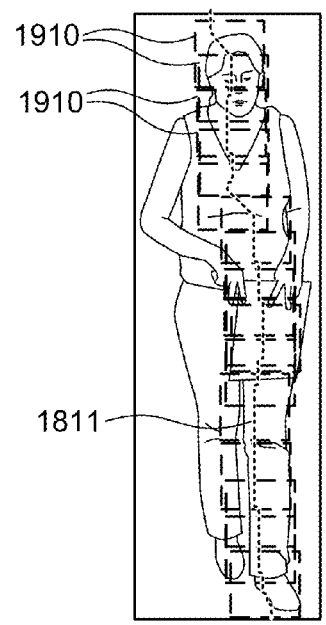
FIG. 19 exemplifies computing a weighted covariance according to embodiments of the invention.

Reference is made to FIG. 10, showing high level block diagram of an exemplary computing device according to embodiments of the present invention. The computing device 102 of FIG. 1 and any of the servers mentioned above may according to embodiments of the invention include or include components similar to a computing device as shown in FIG. 10. For example the search web services 920 of FIG. 9 may include one or more computing devices as shown in FIG. 10 and the search infrastructure may include one or more computing devices as shown in FIG. 19. Computing device 1100 may include a controller 1105 that may be, for example, a computer central processing unit processor (CPU), a chip or any suitable computing or computational device, an operating system 1115, a memory 1120, a storage 1130, an input devices 1135 and an output devices 1140. For example, computing device 102 may include components included in computing device 1100. For example, computing device 102 may include one or more controllers similar to controller 1105, computing device 102 may include one or more memory units similar to memory 1120 and computing device 102 may include one or more executable code segments similar to executable code 1125. Controller 1105 may be configured to carry out methods according to embodiments of the invention. For example, controller 1105 may be connected to memory 1120 storing software or instructions that when executed by controller 1105 cause controller 1105 to carry out method according to embodiments of the present invention. One or more controller(s) 1105, possibly located in separate locations, may be configured to (e.g. by executing software) act as or carry out the operations of the various modules, user interfaces, generators, etc. as described herein. For example, controller 1105 or one or more controllers 1105 may carry out the functions of or act as avatar search 912, signature generator 923, server 933, visual editor 106, image generator 108, etc.

Operating system 1115 may be or may include any code segment designed and/or configured to perform tasks involving coordination, scheduling, arbitration, supervising, controlling or otherwise managing operation of computing device 1100, for example, scheduling execution of programs. Operating system 1115 may be a commercial operating system. Memory 1120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. In one embodiment, memory 1120 is a non-transitory processor-readable storage medium that stores instructions and the instructions are executed by controller 1105. Memory 1120 may be or may include a plurality of, possibly different memory units.

Executable code 1125 may be any executable code, e.g., an application, a program, a process, task or script. Executable code 1125 may be executed by controller 1105 possibly under control of operating system 1115. For example, executable code 1125 may be an application that receives an indication of a location of an object of interest, retrieve from a database a set of MAC addresses used by communication devices present at the indicated location and associates a MAC address with the object of interest, e.g., as described herein.

Where applicable, executable code 1125 may carry out operations described herein in real-time. Computing device 1100 and executable code 1125 may be configured to update process and/or act upon information at the same rate the information, or a relevant events, are received. For example, a search for a target in images as described herein may be performed in real-time. For example, signals and other data provided by receivers such as video sources as described herein may be processed, in real-time, in search infrastructure 930 such that the location of a target may be determined in real-time thus enabling tracking a target in real-time. As noted above, in some embodiments, more than one computing device 1100 may be used. For example, a plurality of computing devices that include components similar to those included in computing device 1100 may be connected to a network and used as a system. For example, associating an object of interest with a characteristic of a communication device may be performed in real-time by executable code 1125 when executed on one or more computing devices such computing device 1100.

Storage 1130 may be or may include, for example, a hard disk drive, a Compact Disk (CD) drive, a CD-Recordable (CD-R) drive, a universal serial bus (USB) device or other suitable removable and/or fixed storage unit. In some embodiments, some of the components shown in FIG. 10 may be omitted. For example, memory 1120 may be a non-volatile memory having the storage capacity of storage 1130. Accordingly, although shown as a separate component, storage 1130 may be embedded or included in memory 1120.

Input devices 1135 may be or may include a mouse, a keyboard, a touch screen or pad or any suitable input device. It will be recognized that any suitable number of input devices may be operatively connected to computing device 1100 as shown by block 1135. For example, images of objects presented to a user may be presented on a display screen connected to computing device 1100.

Output devices 1140 may include one or more displays, speakers and/or any other suitable output devices. It will be recognized that any suitable number of output devices may be operatively connected to computing device 1100 as shown by block 1140. Any applicable input/output (I/O) devices may be connected to computing device 1100 as shown by blocks 1135 and 1140. For example, a wired or wireless network interface card (NIC), a modem, printer or a universal serial bus (USB) device or external hard drive may be included in input devices 1135 and/or output devices 1140.

Embodiments of the invention may include an article such as a computer or processor transitory or non-transitory readable medium, or a computer or processor transitory or non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 1120, computer-executable instructions such as executable code 1125 and a controller such as controller 1105.

A system according to embodiments of the invention may include components such as, but not limited to, a plurality of central processing units (CPU), e.g., similar to controller 1105, or any other suitable multi-purpose or specific processors or controllers, a plurality of input units, a plurality of output units, a plurality of memory units, and a plurality of storage units. An embodiment of system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Some results obtained by experimenting with methods and systems according to embodiments of the invention will now be described with reference to FIGS. 11, 12 and 13.

Figure 11A:
FIG. 11A is a screenshot showing a selection of images of humans that have been identified as candidates for a target human in a selection of sources such as video cameras, according to embodiments of the invention.

FIG. 11A shows a screen shot of the results of a basic search using a simple avatar. As indicated at 111, the search was time limited to between 12:00 pm and 13:00 pm on the day in question. As indicated at 112 the search was restricted to six channels corresponding to six video cameras, in this experiment distributed at public locations around a city, at this point chosen at random. Numeral 113 shows an avatar generated according to data input by a user. In this example the only input was the selection of a white shirt and black jacket and the remainder was according to the default settings of the system used.

On the right side of FIG. 11A the search results are shown for six channels comprising images of humans for which the signature comparison score was highest. Here four images have been selected and are framed in bold rectangles. Each image will have associated with it various metadata including the time and camera location. The images shown in FIG. 11A are images based on which signatures will have been generated, for example according to any of the methods described above or in the following.

Figure 11B:
FIG. 11B is a screenshot showing the identification of the target in additional cameras according to embodiments of the invention.

FIG. 11B shows how images selected by a user may be compared to further images taken from cameras to track the movement of a target. Two slightly different images of the same target are compared to a series of images from a camera identified as camera A56, taken over the same time period. A set of images for each comparison, ordered by match score, is presented for each image, the upper two rows of images shown in the figure. The two sets contain different images and none of them would be selected by the human user as representing the target human. The same two images are compared to a series of images from a camera identified as camera A52. Again two different sets of images are presented, the lower two rows of images shown in the figure. These each contain images of the target, the lower row including more than the upper row. The images of the target are indicated by a bold rectangle.

Figure 12A:
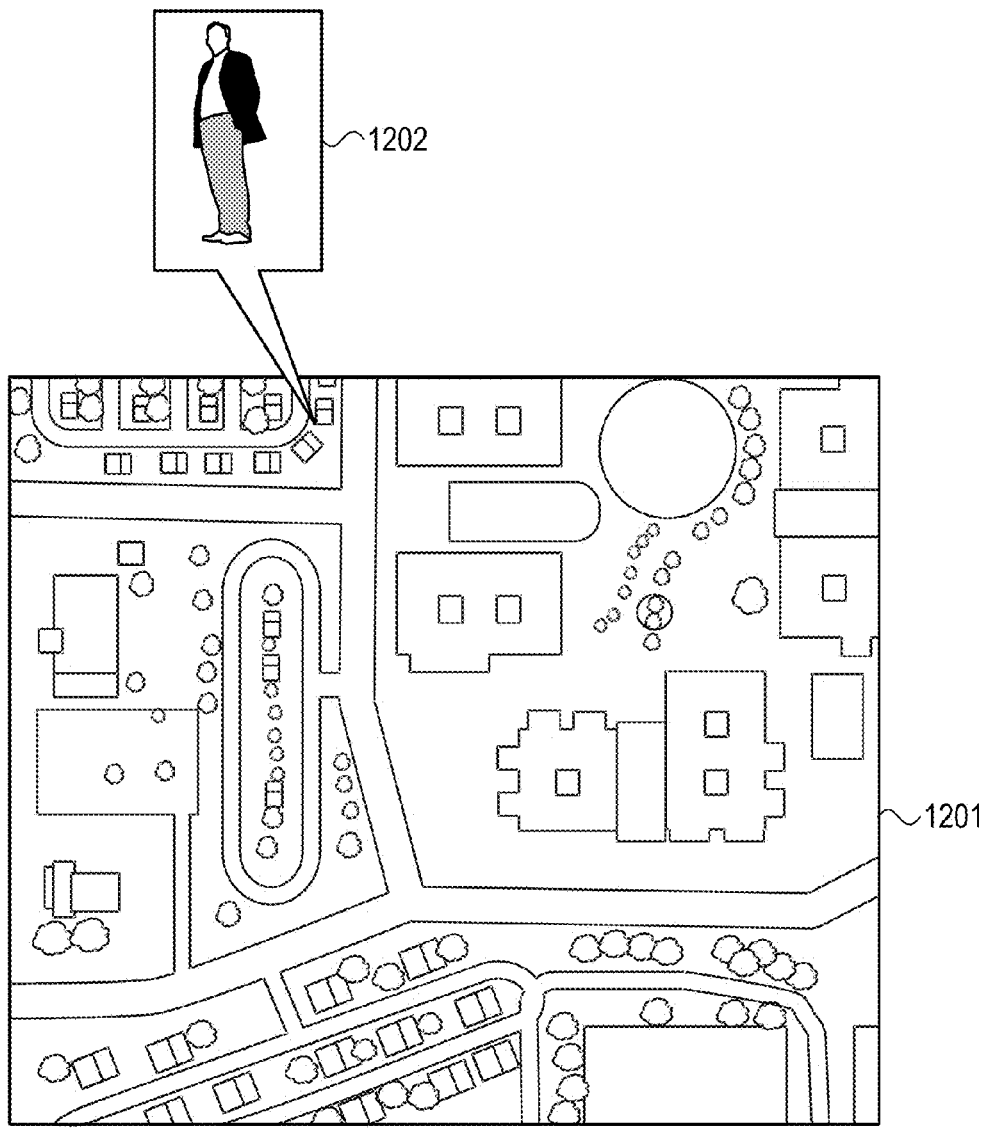
FIG. 12A shows schematically an example presentation of a selected image and the location in which the image was captured according to embodiments of the invention.
Figure 12B:
FIG. 12B is a view similar to FIG. 12A showing data from an experimental implementation of the invention.

FIG. 12A shows schematically how more detail relating to a particular image may be provided to a user. An image 1202 is shown in conjunction with an aerial view of a part of the city in which the camera that provided the selected image is located. FIG. 12B shows a real life example of the information shown in FIG. 12A in which the selected image is inset in the aerial view. The camera location information can be used to identify additional cameras which may have captured images of the target or which are likely to do so.

The results shown in FIGS. 11 and 12 can be used in a variety of ways. For example in a search for a missing person such as a child, camera metadata can be used to determine the location of the child at a particular time and the most recent data can be used to dispatch a person to approach the child and return it to its parents. Similarly with other kinds of object, such as thieves, camera metadata can be used to determine a time and/or location at which to intercept them. In other kinds of operation the results of methods according to embodiments of the invention can be used to covertly monitor the movements of an object.

An alternative method of generating a signature of an image of a human, that is suitable for an avatar as described above or an image supplied from a camera such as a video camera, will now be described with reference to FIGS. 13 to 24. This alternative method may be used instead of the methods described above or it may be used in conjunction with the methods described above. For example, two or more signature generation methods may be combined to derive a composite signature. Alternatively separate signatures for different images may be compared separately to derive separate similarity scores which may then be combined to derive a composite similarity score.

For the method described in the following, although the same general method may be applied to an avatar and to a real image such as from a camera, in the case of an avatar it may be useful to add some noise in order to avoid singularity in the signature calculation. If such noise is added, it will be added before any of the operations below are performed.

Figure 21:
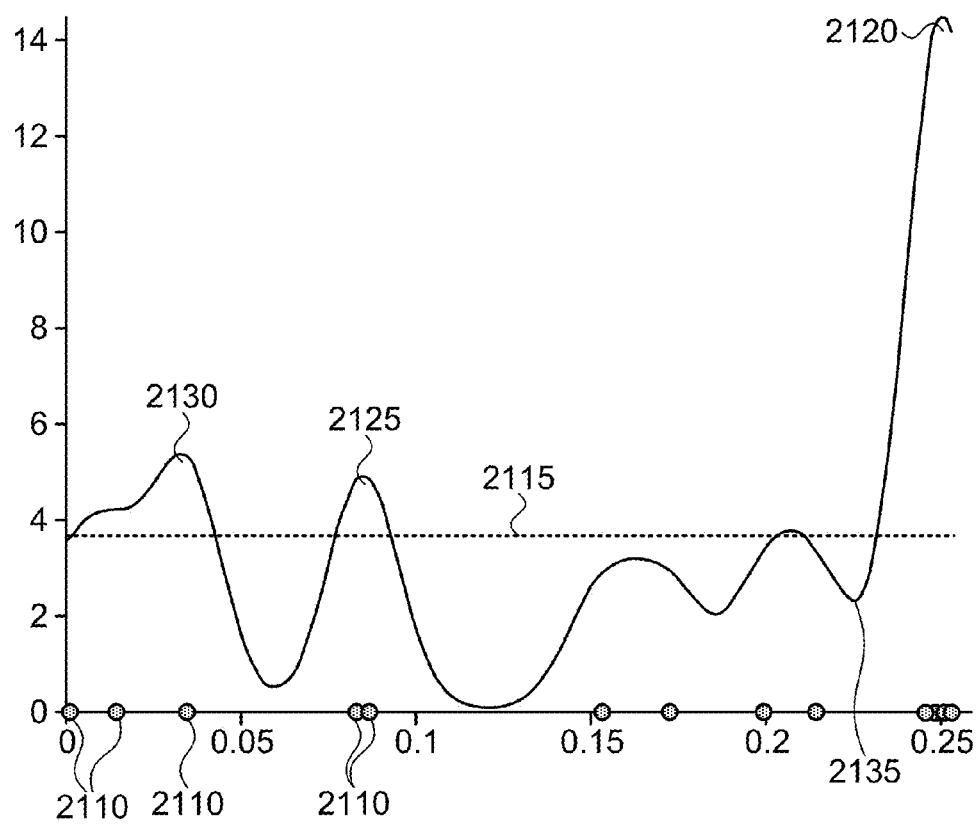
FIG. 21 shows points on a one dimensional space according to embodiments of the invention.
Figure 22:
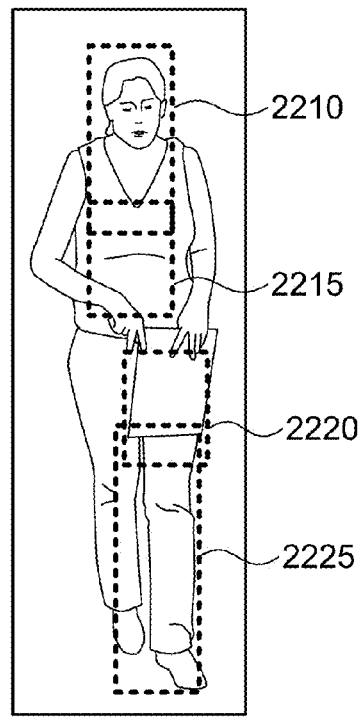
FIG. 22 shows exemplary key-point segments according to embodiments of the invention.
Figure 23:
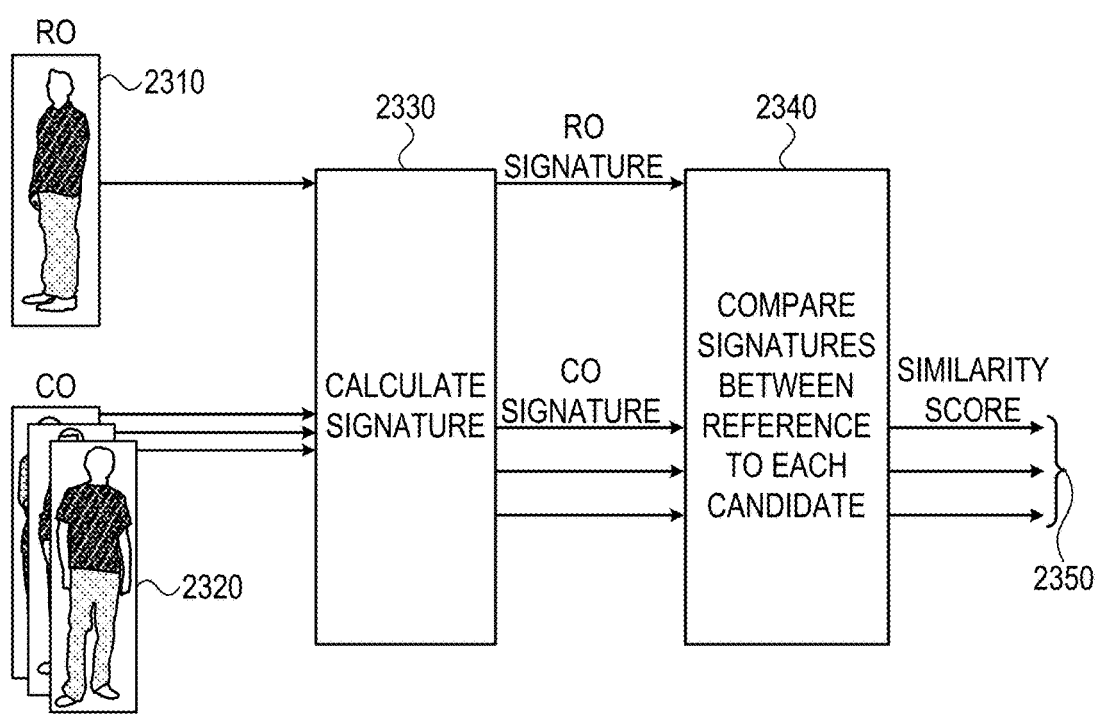
FIG. 23 shows a flow according to embodiments of the invention.
Figure 24:
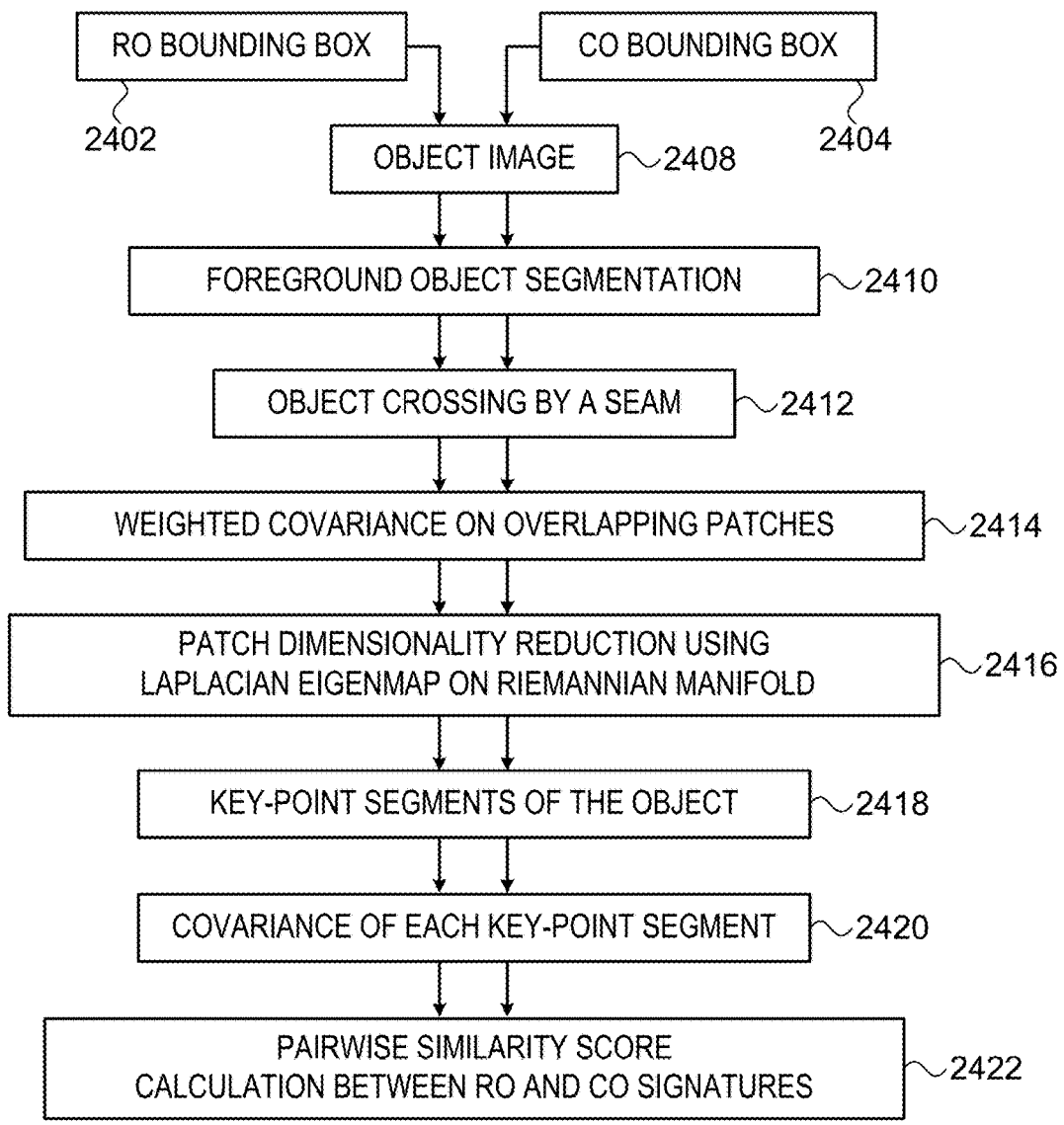
FIG. 24 shows a flow according to embodiments of the invention.

The results of successive operations in the signature generation are illustrated in FIGS. 13 to 22 and the operations are summarized in flow charts shown in FIGS. 23 and 24.

Recall that embodiments of the invention may include the comparison of a signature derived from a real e.g. camera image that shows a reference object RO or target human to a signature derived from another real e.g. camera image that shows a candidate for the target human, also known as the candidate object or CO. According to embodiments of the invention the camera image that shows the reference object may have been selected by comparison with an avatar as described above, and thus embodiments of the invention may include the comparison of a signature derived from an avatar with a signature derived from a real image.

FIG. 23 illustrates how the signature of the RO 2310 may be generated using the same signature generation process as the signature of the COs 2320. The RO may include an avatar or it may include a real image of a human The signatures may be generated in parallel as indicated, with parallel inputs into calculate signature block 2330, or they may be prepared sequentially, or a combination of parallel and serial signature generation may be used. The resulting signatures are subject to comparison as indicated by block 2340 to derive a similarity or match score as indicated by outputs 2350. Each output will be the result of comparing the signature for one RO with the signature for one CO. The general flow illustrated in FIG. 23 is applicable to all methods of signature generation.

FIG. 24 shows a series of operations that may be used in a particular method of signature generation according to an embodiment of the invention. This method may be used as an alternative or in addition to the methods described above.

Figure 13:
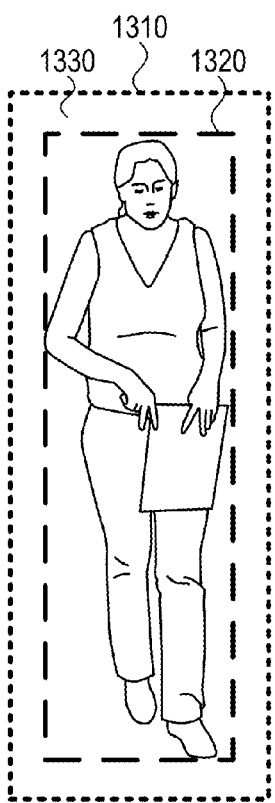
FIG. 13 shows an exemplary image to be subject to signature generation according to embodiments of the invention.

FIG. 13 shows an example of an image of a human that may be used in a system or method according to embodiments of the invention to generate a signature. As shown, rectangle 1310 encompasses foreground object pixels and some background pixels (e.g., ground, floor, vegetation and/or other people in an image), such as might be supplied from a camera. Rectangle 1320 within rectangle 1310 contains less background pixels and includes what is sometimes referred to as a "bounding box" for the part of the image that contains the human. In an embodiment, rectangle 1320 may be marked by a user. For example, an embodiment of a system may present an image and receive a selection of rectangle 1320 from a user. In another embodiment, rectangle 1320 is determined automatically by a system, e.g., using any object recognition method known in the art and surrounding an identified object by a rectangle as shown by rectangle 1320.

According to some embodiments of the invention, rectangle 1320 may be determined by background subtraction (e.g., as disclosed by Piccardi, M., (2004). "Background subtraction techniques: a review". IEEE International Conference on Systems, Man and Cybernetics 4. pp. 3099-3104.). As shown, the margin between rectangle 1310 and rectangle 1320 encompasses only background pixels.

It will be appreciated that this separation of foreground from marginal background, in other words definition of a bounding box, may not be necessary in the case of an avatar. Other methods of separating an object from at least some of its background, for example background in a margin around all or part of an object, may be used according to embodiments of the invention.

Thus, referring to the flow of FIG. 24, an example process of generating signatures for objects according to embodiments of the invention commences with the input of a RO defined by a bounding box at operation 2402 or a CO defined by a bounding box at operation 2404 from which an image is derived at operation 2408. FIG. 24 shows signatures for RO and CO being generated in parallel but they may be generated separately for example in successive operations.

A method according to the invention includes foreground object segmentation of an image, as indicated by operation 2410 in FIG. 24, commencing for example with the pixels within the bounding box 1320. This may be done so as to reduce the amount of data to be processed in the object segmentation operation. Object segmentation may be done by discriminating foreground pixels from background pixels. An embodiment of the invention may assume that the object of interest is included entirely within rectangle 1320 box. It may also be assumed that rectangle 1320 also includes background pixels. Despite possibly having some background pixels in rectangle 1320, an embodiment of the invention may initially label all pixels in rectangle 1320 as foreground, e.g., setting their value to one ("1").

If the pixels outside the bounding box have not already been disregarded, an embodiment of the invention may additionally assume that the margin between rectangle 1320 and rectangle 1310 only includes background pixels. Accordingly, in an embodiment, pixels in area 1330 (the area between rectangles 1320 and 1310) are labeled as background pixels, e.g., by setting their value to zero ("0").

In an embodiment, each pixel in the image from which a signature is to be generated may be characterized by a limited number of features. Five features for each pixel may be used, in this example its red, green and blue (RGB) values and its relative two dimension coordinates in the image (also referred to herein as patch-image XY). Accordingly, in an embodiment, the 5 features of RGB and coordinates are represented by an {R,G,B,X,Y} combination.

A method according to an embodiment includes normalizing a feature, e.g., setting its value to one of "−1" or "+1". A method according to an embodiment uses a Linear Discriminant Analysis (LDA) (e.g., Fisher's Linear Discriminant as disclosed in Fisher, R. A. (1936). "The Use of Multiple Measurements in Taxonomic Problems". Annals of Eugenics 7 (2), pp. 179-188.) to convert the five dimension (5D) feature space, $x_{5D}$, of the pixels into a one dimension (1D) feature space, $x_{1D}$ using the formula below:

$$w = \frac{\mu_{y=1} - \mu_{y=0}}{\sum_{y=1} + \sum_{y=0}},$$

$$x_{1D} = w \cdot x_{5D},$$

$$x_{1D} = \frac{x_{1D}}{\|x_{1D}\|_2}.$$

where w is weight and μ is mean (parameters known in the LDA).

Accordingly, in an embodiment, the pixels are represented on a 1D space. A method according to an embodiment normalizes the values of pixels in the 1D space such that they are associated with one of two values, e.g., one and zero ("1" and "0"). For example, in an embodiment, a value of zero ('0') represents background pixel and a value of ('1') represents a foreground pixel. A method according to an embodiment normalizes the values of pixels in the 1D space using a using Likelihood Ratio Test (LRT) as shown below:

$$LRT = \frac{f(x_{1D}; \mu_{1D,y=1}, \sigma^2_{1D,y=1})}{f(x_{1D}; \mu_{1D,y=1}, \sigma^2_{1D,y=1}) + f(x_{1D}; \mu_{1D,y=0}, \sigma^2_{1D,y=0})}$$

Figure 14:
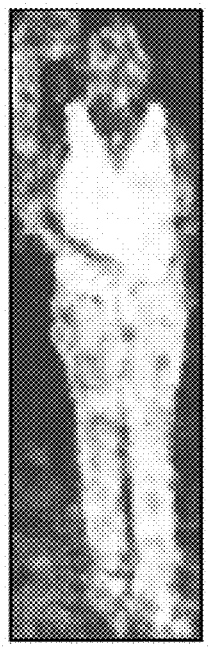
FIG. 14 shows an exemplary output of a foreground object segmentation method according to embodiments of the invention.

FIG. 14 shows an exemplary output of a foreground object segmentation method according to embodiments of the invention in which pixels have a binary value depending on whether or not they belong to the foreground.

Figure 15:
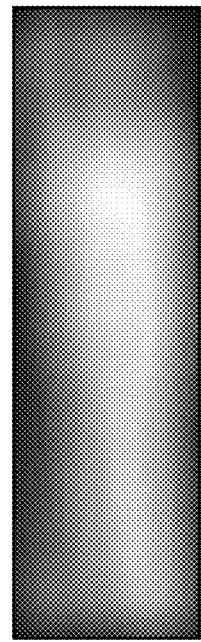
FIG. 15 shows an output of a smoothing of an image according to embodiments of the invention.

As shown by FIG. 14, a resulting image may include noise (or noisy pixels as known in the art). For example and as shown in FIG. 14, some isolated pixel regions are biased towards their false label. A method according to an embodiment smoothes an image (e.g., smooth the image shown in FIG. 14) using a two dimension (2D) average filter with a window size, that is linearly and monotonically dependant in the size of the object. FIG. 15 shows an example output of a smoothing of the image, noted by $LRT_f$, shown in FIG. 14. For example, the image shown by FIG. 14 is an example of an image in which pixels were normalized to LRT as described and the image shown in FIG. 15 is an example of the output of the image in FIG. 14 after smoothing it, e.g., as described above.

Next according to embodiments of the invention, the pixels of the extracted object, in this case human figure, are subject to further processing to determine regions of a similar attribute such as color or texture or combination of color and texture. These regions are termed in the following "Key Point Segments" or KPSs. For each KPS a parameter may then be determined and the resulting set of KPS parameters may include a signature of the object. In the example to be described below, the parameter is a covariance value, derived for example from values determined for the pixels in the KPS. Signatures of different objects may be compared in order to determine similarity between objects and produce a similarity or match score. The determination of the KPSs may include deriving a number of patches along a line of highest cumulative attribute value traversing the object and subjecting the patches to further processing to determine a number of KPSs that is lower than the number of patches.

The next operation in this signature generation, operation 2412 in FIG. 24, may be to determine a curve (also referred to herein as a seam, centerline or simply a line) that crosses an object along its highest cumulative values, for example cumulative values of parameters representing probability that an object is background. In an embodiment, the cumulative values are obtained from a filtered image, $LRT_f$, as described herein, where each pixel (or value of each pixel) is in the range of [0,1] and where '0' represents the background and '1' represents the foreground as described. In an embodiment, the seam or curve computed is along a symmetric axis of the geodesic surface of the foreground object. The cumulative values may be determined for each pixel and may be based on the value for the pixel and the value of one or more adjacent pixels.

A method according to an embodiment finds a seam or curve in a dynamic programming manner. In an embodiment, dynamic programming includes computing a path of highest values. The values in this example represent energy as explained below but in other embodiments values of other parameters may be used. For example, for each pixel in a vertical row in an image, a cumulative value of the pixel is calculated based on the value of the current pixel and the value of one of three pixels above it, for example the one of the three with the highest value. The three pixels may be in the row above the pixel whose cumulative value is being computed, for example the pixel immediately above and the one on each side, or diagonally above or adjacent to the pixel whose cumulative value is being computed.

Figure 16:
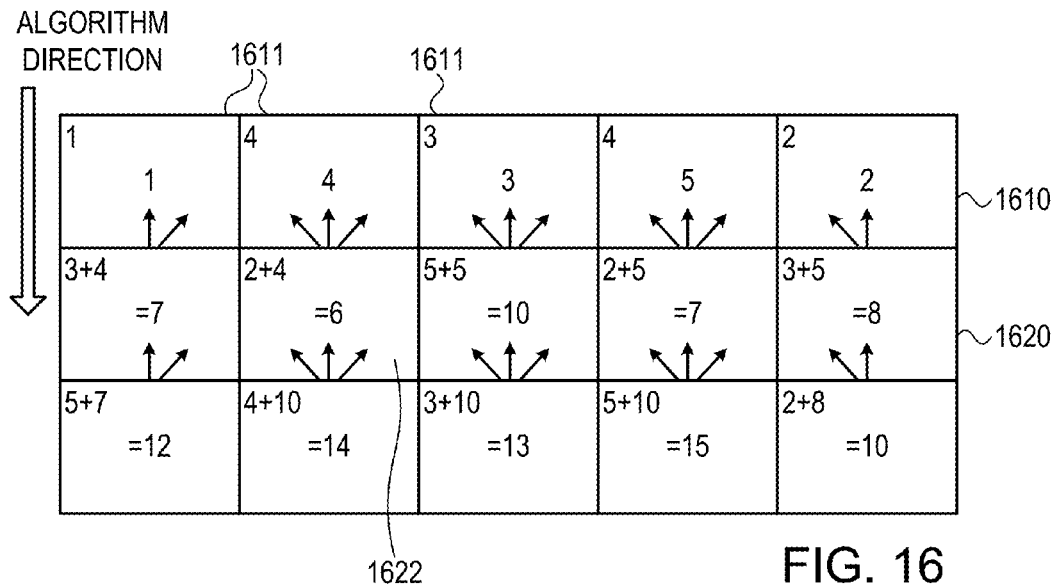
FIG. 16 graphically illustrates determining a curve according to embodiments of the invention.
Figure 18:
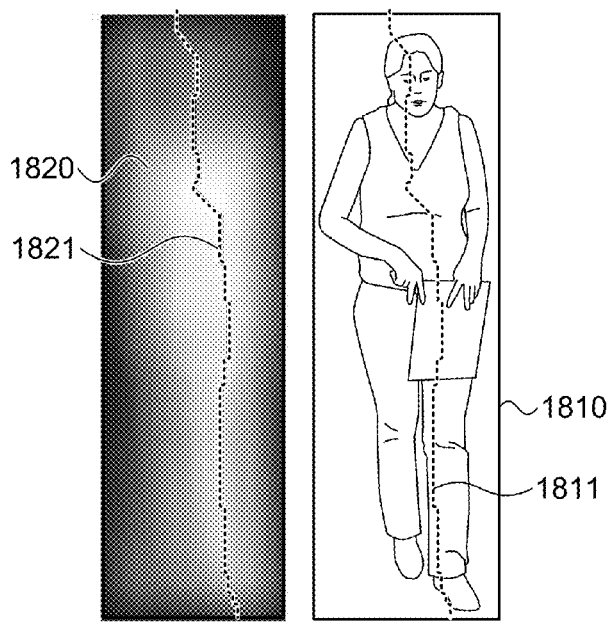
FIG. 18 shows an output of a curve generation process according to embodiments of the invention.

FIG. 16 graphically illustrates determining a curve, seam, line or centerline across or along an image according to embodiments of the invention. The squares in FIG. 16 represent pixels in an image and each has an energy value determined from the LRT described above. As shown by the row of pixels 1610, the first row has no rows above it, so the sum or cumulative value (as shown by the values 1, 4, 3, 5 and 2) is just the value of the current pixel. A curve, seam, line or centerline across or along an image may be defined or determined based on attributes of an object in an image as further described herein. In the example to be described below the attribute is energy value. Other attributes such as . . . may be used. It will be noted that a curve, seam, line or centerline automatically determined as described herein may not necessarily traverse the center of an object in an image. For example, a curve, centerline or line defined as illustrated by FIG. 18 traverses the left leg of the object and not the center of the object.

Referring to the second row of pixels 1620 in FIG. 16, and further to the second pixel from left as shown by 1622, the energy value of the pixel is 2. As shown by pixels 1611, a choice of either 1, 4, or 3 values exists. A method according to an embodiment selects the maximal value of the three upper neighboring pixels. In other embodiments, other sets of upper neighboring pixels may be selected or used as described herein. For example, in the case of pixel 1622 and upper neighboring pixels 1611, since 4 is the maximal value, an embodiment of the invention sets the value of the pixel to its energy value (which is 2 in the current example) plus 4 (the maximal value selected from the values of the three upper neighboring pixels). Accordingly and as shown, in this example, the value of pixel 1622 is set to six ("6").

In an embodiment, values for other pixels in the second row are set in a similar way as shown. For example, the value of the pixel immediately to the right of pixel 1622 is set to ten ("10") since, as shown, its original value is five ("5") and the three relevant pixels' values are 4, 3 and five, accordingly, the maximal value of the neighboring pixels is five and the resulting value is 5+5=10. In an embodiment, the process proceeds similarly for all rows of pixels in an image as shown.

Figure 17:
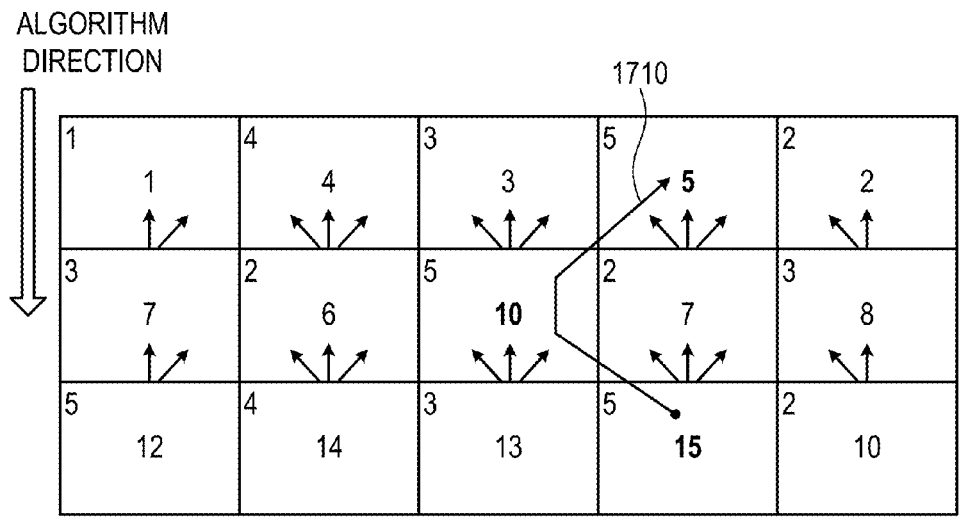
FIG. 17 shows a curve defined according to embodiments of the invention.

In an embodiment, after setting pixels' cumulative values as described herein with reference to FIG. 16, a seam, curve or path is produced or defined based on a line that traverses the pixels with highest values in each row. FIG. 17 shows a seam, curve or path that would be generated or defined based on pixels' and values shown by FIG. 16. As shown, curve, path or seam 1710 traverses pixels with the highest values in each row.

FIG. 18 shows an example of an output of a seam or curve generation process according to embodiments of the invention. As shown by seam or curve 1811 drawn on image 1810, a seam or curve may be drawn or placed on an original image (e.g., the image shown in FIG. 13). As shown by curve 1821, a seam or curve may be drawn or placed on a filtered image (e.g., on the image shown in FIG. 15). As shown, in an embodiment, a seam or curve produced as described herein crosses the object of interest (e.g., an RO or CO). It will be appreciated that a similar line for an avatar of the kind described above may include more linear sections than that for a camera image.

A method according to an embodiment next computes a weighted covariance on overlapping areas or patches, shown as operation 2414 in FIG. 24. FIG. 19 exemplifies computing a weighted covariance according to embodiments of the invention. As shown by areas or patches 1910, in an embodiment, overlapping patches are placed on a seam or curve, e.g., on seam or curve 1811 as shown. In an embodiment, the number of patches and the percentage of the overlap area are linearly and monotonically dependent on the size of the object as exemplified in FIG. 19.

As shown in FIG. 19, by defining and placing areas or patches such that the number of areas or patches and the percentage of the overlapping between patches area are linearly and monotonically dependent on the size of the object, most of the area covered by patches placed on a seam or curve as described covers foreground information. The patches may be rectangles. The patches they may have predefined dimensions, e.g. height and width, determined for example from the height of the object. Accordingly, by defining and placing patches as described, the patches are automatically placed on the object of interest and not on background areas.

In case a patch exceeds the boundary of the object, it will contain more of the background information and less information of the object of interest or the foreground portion of the image. In one embodiment, each pixel in a patch is characterized by 5 features—its RGB value and its patch-image XY coordinates, the characterizing 5 features are denoted herein as {R,G,B,X,Y}. In an embodiment, each such feature is normalized to [−1, +1], e.g., using a method similar to the normalizing method described herein with respect to a {R,G,B,X,Y} feature. Other color schemes and sets of data characterizing pixels may be used.

According to an embodiment covariance matrices for patches are calculated. In an embodiment, a matrix calculated can be considered to represent the spatial color and texture information of a patch. As with the signature generation discussed above, but in a different way, the methods of signature generation described in connection with FIGS. 11 to 23 describe relationships between color components, or the complete set of RGBXY components, which may be referred to as textural information. A matrix may be unique for each patch due to the different {R,G,B,X,Y} of each patch. Some pixels may be less informative than others, for example, since they might be background pixels. Some pixels may be less informative since they are far from the center of the patch. Accordingly, a method according to an embodiment associates a weight to pixels so that a pixel influences a calculated covariance matrix according to how informative it is. For example, an embodiment calculates a weighted covariance matrix including a value for each pixel according to the formula below:

$$w_i = \frac{\exp\left\{-\frac{\alpha_1 \cdot [(x - \mu_x)^2 + (y - \mu_y)^2]}{u\sigma_1^2}\right\} \cdot (LRT_f)^{\alpha_2}}{\sum \exp\left\{-\frac{a_1 \cdot [(x - \mu_x)^2 + (y - \mu_y)^2]}{2\sigma_1^2}\right\} \cdot (LRT_j)^{\alpha_z}},$$

where $\alpha_1 + \alpha_2 = 1$, s.t. $\sum_i w_i = 1$, where in the formula above, $\{x,y\}$ is the coordinate of the $i^{th}$ pixel in a patch, $\{\mu_x, \mu_y\}$ is the center of the patch, and the summation is over all the pixels in the patch.

In an embodiment, a covariance for a patch is then calculated as follows:
weighted mean vector $\bar{x}$ is given by $$\bar{x} = \Sigma_i w_i x_i,$$

where $x_i$ is the x-coordinate of the $i^{th}$ pixel in a patch.

In an embodiment, an element $q_{jk}$ of features j and k in a weighted covariance matrix, where j and k are the indices of the RGBKY elements, weighted covariance wCov, is calculated according to the formula:

$$q_{jk} = \frac{\sum_l w_l}{\left(\sum_t w_t\right)^2 - \sum_t w_t^2} \cdot \sum_i w_i (x_{ij} - \bar{x}_j)(x_{ik} - \bar{x}_k).$$

A method according to an embodiment reduces patch dimensionality using Laplacian eigenmap on Riemannian Manifold, as indicated by operation 2416 in FIG. 24. Specifically, a method according to an embodiment reduces the dimensionality of the twenty five dimension (25D) weighted covariance matrix described above (25 being the number of non-redundant elements in the covariance matrix) to three dimensions (3D). In an embodiment, a Gramian matrix is calculated, where for each couple of weighted covariances, $wCov_i$ and $wCov_j$, their corresponding value $A_{ij}$ in the Gramian matrix, A, is calculated by:

$$A_{ij} = \exp\left\{\frac{[dist(wCov_i, wCov_j)]^2}{\sigma}\right\},$$

where the distance, $dist(wCov_i, wCov_j)$, is the geodesic distance between the covariances, which are positive semi-definite. A method according to an embodiment finds this distance by solving the generalized eigenvalues problem:

$$wCov_i \cdot v = \lambda \cdot wCov_j \cdot v,$$

where the resulting generalized eigenvalues, $\lambda$, are used to calculate the distance $dist(wCov_i, wCov_j)$ by:

$$dist(wCov_i, wCov_j) = \sqrt{\Sigma_i (\log \lambda_i)^2}.$$

Having calculated or obtained A, a method according to an embodiment calculates a diagonal matrix, D, where an element $D_{ii}$ on the diagonal is:

$$D_{ii} = \Sigma_j A_{ij}.$$

Representing the unnormalized Graph Laplacian by L=D−A, the generalized eigenvalues problem as known in the art (sometimes known as "eigendecomposition" or "spectral decomposition" of a matrix) is solved in an embodiment by:

$$Lv = \lambda Dv,$$

The first three non-zero eigenvectors are then selected and subtracted from their mean values to produce a new 3D feature vector by:

$$v - \lambda_v.$$

Figure 20:
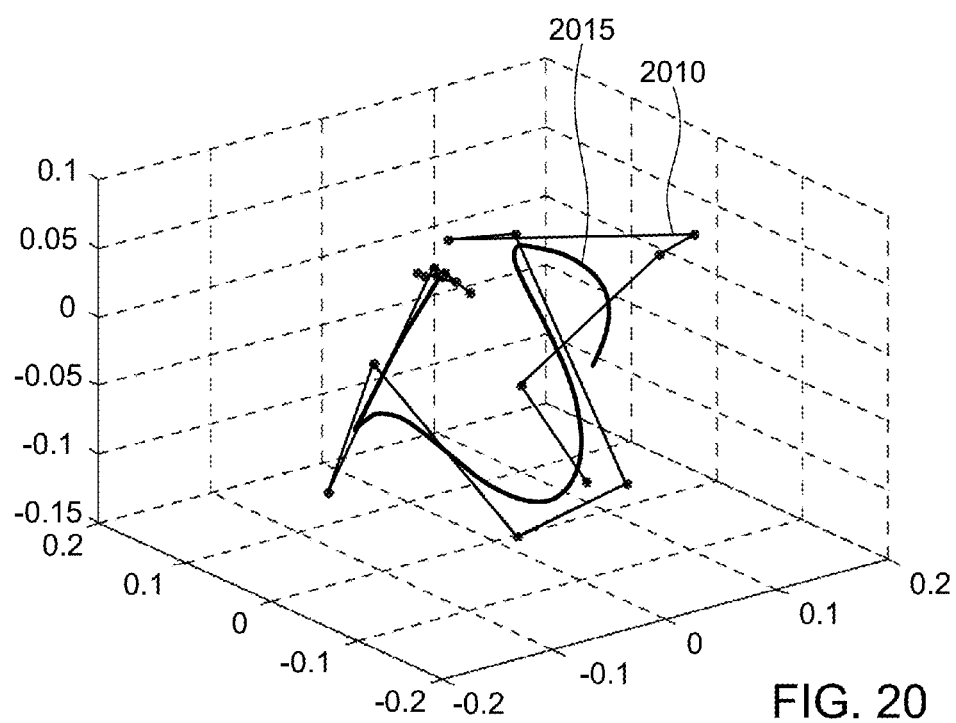
FIG. 20 represent weighted covariances of patches according to embodiments of the invention.

In an embodiment, the weighted covariance points produced as described are projected onto a 3D space as exemplified by FIG. 20.

The 3D points shown in FIG. 20 represent the weighted covariances of patches calculated as described herein. A distance between any two points shown in FIG. 20 is proportional to the similarity of the patches the points represent. That is, two points on curve 2010 which are close to each other represent patches which are similar with respect to color and texture. Similarly, two points on curve 2010 which are far from each other represent two patches which are different with respect to color and texture.

In one embodiment, in order to avoid clustering together patches which are similar with respect to color and texture but which further represent patches (or areas) which are far from each other on the actual image plane (e.g., hat and shoes), only adjacent points are connected to produce curve 2010. In an embodiment, the patches are ordered from the top (e.g., head) of the object to its bottom (e.g., feet). According to an embodiment, curve 2010 is produced by connecting adjacent patch-points. Curve 2015 may be produced, calculated or generated by smoothing curve 2010.

In one embodiment, a smoothed curve, e.g., as shown by curve 2015 is produced, calculated or generated by (1) projecting the 3D patch-points onto a 1D dimension (string dimension) using a Laplacian eigenmap technique as described above, where using Euclidian distances in the Gramian matrix and all but adjacent points are set to zero; and (2) for any new point in the 1D axis, reconstructing the 3D representation using embedding. In an embodiment, embedding of a given 1D point in a smoothed 3D point is the weighted average of all the original 3D patch-points, where the weights are calculated according to the distances between the given 1D point to all other 1D points.

Next, in an embodiment, key-point segments of the object are determined using the curve shown in FIG. 20, as indicated by operation 2418 in FIG. 24. In an embodiment, the patch-point string on the 3D space is flatten/unwrapped into a 1D space. For that, a method according to an embodiment may calculate a vector of the square of the Euclidian norm of the gradient of the string in the 3D space according to the formula:

$$str = \|\nabla f\|_2^2 = \left\|\frac{\partial f}{\partial x}i + \frac{\partial f}{\partial y}j + \frac{\partial f}{\partial z}k\right\|_2^2,$$

A cumulative sum, S, of the above expression is calculated by:

$$S_0=0, S_{n+1}=S_n|str_i$$

A method according to an embodiment unfolds the geodesic structure of the string that lay on the 3D space into a 1D space, such that the pairwise distances between points on the 3D geodesic structure are most faithfully preserved on the 1D sub-manifold. FIG. 21 exemplifies points on the 1D space are represented by circles 2110. Circles 2110 represent the patch-points ordered from the top of the object to its bottom and they are positioned next to each other according to their color and texture characteristics.

A method according to an embodiment includes calculating a Kernel Density Estimation (KDE) on patch-points 2110 as shown by KDE 2135 using a Gaussian kernel as shown below:

$$KDE(x)=\Sigma_i f(x;\mu=S_i,\sigma).$$

KDE 2135 represents the distribution of color-texture clusters of the object. A method according to an embodiment sets a threshold as shown by 2115 that cuts the KDE and only preserves highly dense regions. For example, highly dense regions 2120, 2125 and 2130 are identified using the threshold:

$$th = \frac{\sqrt{2\pi}}{3.75 \cdot S_{end}},$$

where $S_{end}$ is the last element of the cumulative sum, S, calculated above.

Regions identified based on a threshold (e.g., as shown by regions 2120, 2125 and 2130 identified based on threshold 2115) represent clusters or segments of similar color-texture patches on the object and which are also relatively big in size. These regions are referred to herein as key-point segments (KPSs). When producing a KDE as described herein, dense areas or regions such as regions 2120, 2125 and 2130 in the KDE can be created only by many nearby patch-points.

Accordingly, a large area on the object, characterized by similar color and texture, would be represented by a few patches which would fall in vicinity on the 1D space and also would pass the thresholding as shown by threshold 2115 and described herein. In an embodiment, KPSs are used for representing the object of interest.

Reference is made to FIG. 22 that shows four exemplary KPSs that are identified by a method in accordance with the current example. As shown, the four KPSs capture or identify four different areas on the object, each of which is different from the others and each is relatively coherent in color and texture. As shown, the four KPSs represent (1) the head and neck area which is dominated by the color and texture of the skin; (2) the shirt area; (3) the paper that the person is holding; and (4) the trousers area.

In an embodiment, an object is represented by a set of covariances, one for each KPS. In an embodiment, as indicated by operation 2420 in FIG. 24, a covariance of a KPS is calculated for all the pixels included in the KPS, where each pixels is characterized by 5 features—its RGB value and its segment-image XY coordinate {R,G,B,X,Y}.

In one embodiment, a signature of an object is a set covariance of KPSs calculated as described herein. Accordingly, a set of covariance of KPSs calculated for an object (e.g., RO or CO) is also referred to herein as signature of the object. As described herein, a covariance of a KPS or a signature of an object may be unique for the object thus, a signature can be used to identify an object of interest. Signatures of first and second objects in an image (or in two images) may be used in order to determine whether or not the two objects in the image or images represent the same or different actual objects.

A method according to an embodiment includes calculating an image pairwise similarity score between signatures of an RO, e.g. avatar, and a CO, as indicated by operation 2422 in FIG. 24. For example, given signatures of two objects (e.g., an RO and a CO), an embodiment of the invention calculates their similarity. As described above, each object may be represented by a set of KPSs, each of which is represented by a covariance matrix. In an embodiment, a method determines two objects are similar if the set of covariance matrices of one object is similar to the set of covariance matrices of the second object. In other words, according to some embodiments of the invention, the set of KPSs and corresponding covariance matrices include a signature which may be compared to another signature in order to derive a match score.

An image of an object may be captured from different angles and body poses and holding different instruments (e.g. a handbag), and therefore the number of KPSs may vary between objects. For example and as described, the person shown in FIG. 13 is holding a piece of paper, which is represented by a KPS. Although this piece of paper is relatively discriminative (and can significantly reduce false positives), it may also be reasonable that the same person will not hold or reveal that piece of paper when being captured by a second camera at a different time and location. Therefore, in some cases, not all KPSs of a first object will have a high similarity to KPSs of the second object. Accordingly, an embodiment may determine a match between a first and second objects exists even if only some of the KPSs of the objects are similar. Otherwise described, to determine a match between two objects, an embodiment of the invention may not necessarily impose inter object pairwise similarities to all KPSs of the two objects, but only to as many KPSs as possible. For example, a configuration parameter may be used such that a similarity of three KPSs (or any other number) suffices in order to determine two objects in images represent the same actual or physical object.

In an embodiment, similarities of all KPSs of one object are calculated for all KPSs of a second object and an embodiment of the invention selects the couplings that yield the highest combined similarity score. For example, the distance between two covariance matrices are calculated as before using the geodesic distance and this is formulated into a probability using the exponential family. An embodiment of the invention then looks for a subset of pairwise combinations of KPSs from both objects (e.g., RO and CO) such that a similarity function is maximized, for example, using the formula:

$$\underset{R_s \subseteq R_a, C_s \subseteq C_a, o\_i \in R_s, o\_j \in C_s}{\mathrm{argmax}} \left\{ \alpha_1 \cdot \left\{ \prod_{k=1}^{|R_s|} \exp\left(-\frac{[dist(Cov_R^{o\_i(k)}, Cov_C^{o\_j(k)})]^2}{\sigma^2}\right) \right\} - \alpha_2 \cdot \left(\frac{|R_a|-|R_s|+|C_a|-|C_s|}{|R_a|+|C_a|}\right) \right\}$$

where $R_a$ is the set of all KPSs of the RO, and $|R_a|$ is the number of all KPSs of the RO; $R_s$ is a subset of KPSs of the RO, and $|R_s|$ is the number of KPSs of that subset; $C_a$ is the set of all KPSs of the CO, and $|C_a|$ is the number of all KPSs of the CO; $C_s$ is a subset of KPSs of the CO, and $|C_s|$ is the number of KPSs of that subset; o_t is the index in $R_s$ that points to a KPS that corresponds to a KPS in $C_s$ by an index o_j; $Cov_R^{o\_t(k)}$ is the covariance matrix of the $k^{th}$ KPS in $R_s$; $Cov_C^{o\_j(k)}$ is the covariance matrix of the $k^{th}$ KPS in $C_s$; $\alpha_1$ and $\alpha_2$ are the weights given to the first and second terms, respectively, in the calculation. The first term captures the pairwise similarities of KPSs from the two subsets, $R_s$ and $C_s$. The second term penalizes for KPSs that are excluded from the two subsets, $R_s$ and $C_s$, and this way, small pairwise subsets (e.g., small number of KPSs in $R_s$ and $C_s$ relatively to $R_a$ and $C_a$) with high similarity scores are penalized if they do not include many of the rest of the KPSs in $R_a$ and/or $C_a$. The output is a similarity score $\epsilon[0,1]$.

As described herein, signatures may be generated for an RO and for a plurality of COs. As described herein, a match between each CO in the plurality of COs and the RO may be calculated or determined based on a match between signatures. In an embodiment, a score is associated with each CO based on the match level of the CO and an RO. Accordingly, by associating COs with a score as described, the higher the score, the more probable it is that the CO is the RO.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method of detecting a particular human in a plurality of images of humans, the method comprising:
   using one or more processors:
      receiving input data describing the appearance of the particular human;
      generating a representation of the particular human based on the input data;
      generating an avatar signature for the particular human based on said representation;
      automatically extracting images of humans from the plurality of images and generating respective human signatures for at least some of the humans based on the extracted images;
      using the representation to identify one or more of the humans in said plurality of images as a candidate for the particular human by comparing the avatar signature with the human signatures,
      wherein the generation of the avatar signature comprises:
         dividing the representation into avatar body parts;
         determining a first set of dominant colors for each avatar body part;
         dividing the avatar body parts into avatar layers; and
         determining a first distribution of only the first set of dominant colors on the avatar layers, and
      wherein the generation of each human signature comprises:
         dividing an image corresponding to the human into human body parts;
         determining a second set of dominant colors for each human body part;
         dividing the human body parts into human layers; and
         determining a second distribution of only the second set of dominant colors on the human layers.

2. The method of claim 1 wherein at least some of operations performed on said representation in order to generate the avatar signature for the particular human are also performed on the extracted images in order to generate said human signatures for humans included in the images.

3. The method of claim 1 comprising using one or more identified candidates to identify one or more humans in further images as further candidates for the particular human.

4. The method of claim 3 wherein identifying one or more humans in further images comprises:
   comparing a human signature for an identified candidate with further human signatures for humans generated using images extracted from further video footage.

5. The method of claim 1 wherein the input is received via a graphical user interface (GUI) and said GUI presents a set of visual descriptors of a human figure and the input data comprises a selection of said visual descriptors.

6. The method of claim 1 wherein the input is received via a graphical user interface (GUI) and wherein said GUI presents a figure representing a human and is configured to receive input to change the figure to more closely resemble the particular human.

7. The method of claim 1 wherein said input data comprises a sketch of at least part of the particular human.

8. The method of claim 1, wherein each avatar body part is divided into 3 avatar layers, and wherein each human body part is divided into 3 human layers.

9. The method of claim 1, wherein the avatar layers and the human layers are horizontal layers.

10. The method of claim 1, wherein the avatar layers and the human layers are of even depth.

11. A system for detecting a particular human in a plurality of images of humans, the system comprising:
   one or more processors;
   at least one display device for displaying a graphical user interface (GUI);
   one or more input devices enabling input of data describing the appearance of the particular human via the GUI;
   the one or more processors being configured to:
      generate a representation of the particular human based on the input data;
      generate an avatar signature for the particular human based on said representation;
      extract images of humans from the plurality of images and generate respective human signatures for at least some of the humans based on the extracted images;
      use the representation to identify one or more of the humans in said plurality of images as a candidate for the particular human by comparing the avatar signature with the human signatures,
      wherein the generation of the avatar signature comprises:
         dividing the representation into avatar body parts;
         determining a first set of dominant colors for each avatar body part;
         dividing the avatar body parts into avatar layers; and determining a first distribution of only the first set of dominant colors on the avatar layers, and wherein the generation of each human signature comprises:
dividing an image corresponding to the human into 5 human body parts;
determining a second set of dominant colors for each human body part;
dividing the human body parts into human layers; and
determining a second distribution of only the second set of dominant colors on the human layers.

12. The system of claim 11, wherein each avatar body part is divided into 3 avatar layers, and wherein each human body part is divided into 3 human layers.

13. The system of claim 11, wherein the avatar layers and the human layers are horizontal layers.

14. The system of claim 11, wherein the avatar layers and the human layers are of even depth.

\* \* \* \* \*